(12) United States Patent
Ramaswami

(10) Patent No.: US 6,792,174 B1
(45) Date of Patent: Sep. 14, 2004

(54) METHOD AND APPARATUS FOR SIGNALING BETWEEN AN OPTICAL CROSS-CONNECT SWITCH AND ATTACHED NETWORK EQUIPMENT

(75) Inventor: Rajiv Ramaswami, Sunnyvale, CA (US)

(73) Assignee: Nortel Networks Limited, St. Laurent (CA)

( * ) Notice: Subject to any disclaimer, the term of this patent is extended or adjusted under 35 U.S.C. 154(b) by 4 days.

(21) Appl. No.: 09/704,445

(22) Filed: Nov. 1, 2000

Related U.S. Application Data

(60) Provisional application No. 60/200,425, filed on Apr. 28, 2000, provisional application No. 60/186,108, filed on Mar. 1, 2000, provisional application No. 60/170,092, filed on Dec. 10, 1999, provisional application No. 60/170,093, filed on Dec. 10, 1999, provisional application No. 60/170,094, filed on Dec. 10, 1999, provisional application No. 60/170,095, filed on Dec. 10, 1999, and provisional application No. 60/162,936, filed on Nov. 2, 1999.

(51) Int. Cl.$^7$ ................................................. G02B 6/42
(52) U.S. Cl. ........................... 385/17; 385/16; 385/18; 385/24; 385/31; 385/39; 359/127; 359/128; 359/124; 359/114; 359/115
(58) Field of Search ............................ 385/16, 17, 18, 385/24, 31, 39; 359/127, 128, 114, 115, 124; 370/228

(56) References Cited

U.S. PATENT DOCUMENTS

| | | | |
|---|---|---|---|
| 3,651,392 A | 3/1972 | Frisch et al. | 318/561 |
| 4,365,863 A | 12/1982 | Broussaud | |
| 4,369,523 A | 1/1983 | Seki et al. | |
| 4,437,190 A | 3/1984 | Rozenwaig et al. | 455/600 |
| 4,470,154 A | 9/1984 | Yano | 455/607 |
| 4,519,670 A | 5/1985 | Spinner et al. | 350/96.15 |
| 4,530,566 A | 7/1985 | Smith et al. | 350/96.2 |
| 4,563,774 A | 1/1986 | Gloge | |
| 4,580,873 A | 4/1986 | Levinson | |
| 4,612,670 A | 9/1986 | Henderson | 455/607 |
| 4,634,239 A | 1/1987 | Buhrer | 350/486 |
| 4,797,879 A | 1/1989 | Habbab et al. | |
| 4,817,014 A | 3/1989 | Schneider et al. | |
| 4,843,382 A | 6/1989 | Oda et al. | |
| 4,856,863 A | 8/1989 | Sampsell et al. | |
| 4,859,012 A | 8/1989 | Cohn | |
| 4,886,335 A | 12/1989 | Yanagawa et al. | |
| 4,897,830 A | 1/1990 | Hill et al. | 370/4 |

(List continued on next page.)

FOREIGN PATENT DOCUMENTS

| | | | |
|---|---|---|---|
| EP | 0 674 457 A2 | 9/1995 | |
| EP | 0721275 A2 | 12/1995 | H04M/3/36 |

(List continued on next page.)

OTHER PUBLICATIONS

Types and Characteristics of SDH Network Protection Architectures; ITU–T Recommendation G.841 (10/98).

(List continued on next page.)

Primary Examiner—Tarifur R. Chowdhury
Assistant Examiner—George Y. Wang
(74) Attorney, Agent, or Firm—Blakely Sokoloff Taylor & Zafman, LLP

(57) ABSTRACT

Methods, apparatus and systems for signaling information between an optical cross-connect switch and attached network equipment such as Internet Protocol (IP) routers, WDM terminals, SONET add/drop multiplexers and ATM switches. In one embodiment, an out-of-band signaling interface between an optical cross-connect switch and attached network equipment is realized by using an out-of-band communication channel over a network. In another embodiment, a decentralized signaling interface is provided by one or more dedicated signal lines between an optical cross-connect switch and attached network equipment.

63 Claims, 12 Drawing Sheets

U.S. PATENT DOCUMENTS

| | | |
|---|---|---|
| 4,903,225 A | 2/1990 | Brost |
| 4,982,446 A | 1/1991 | Lord et al. .................. 455/606 |
| 4,984,238 A | 1/1991 | Watanabe et al. |
| 5,035,482 A | 7/1991 | Ten Berge et al. ........ 350/96.2 |
| 5,037,173 A | 8/1991 | Sampsell et al. |
| 5,157,652 A | 10/1992 | Walker ........................ 370/17 |
| 5,216,729 A | 6/1993 | Berger et al. |
| 5,253,274 A | 10/1993 | Janniello et al. ............. 375/121 |
| 5,260,819 A | 11/1993 | Hadjifotiou et al. |
| 5,272,556 A | 12/1993 | Faulkner et al. ............ 359/125 |
| 5,299,044 A | 3/1994 | Mosch et al. ............... 359/110 |
| 5,349,550 A | 9/1994 | Gage |
| 5,355,238 A | 10/1994 | Kight et al. ................. 359/135 |
| 5,359,683 A | 10/1994 | Pan |
| 5,440,654 A | 8/1995 | Lambert, Jr. |
| 5,477,364 A | 12/1995 | Pearson ...................... 359/139 |
| 5,485,300 A | 1/1996 | Daley ......................... 359/180 |
| 5,487,120 A | 1/1996 | Choy et al. .................. 385/24 |
| 5,488,862 A | 2/1996 | Neukermans et al. |
| 5,515,361 A | 5/1996 | Li et al. ....................... 370/15 |
| 5,521,732 A | 5/1996 | Nishio ........................ 359/120 |
| 5,521,734 A | 5/1996 | Frigo .......................... 359/152 |
| 5,524,153 A | 6/1996 | Laor |
| 5,535,293 A | 7/1996 | Buchin |
| 5,539,328 A | 7/1996 | Mirov et al. |
| 5,570,371 A | 10/1996 | Iga ............................... 370/99 |
| 5,608,735 A | 3/1997 | McCullough et al. |
| 5,629,790 A | 5/1997 | Neukermans et al. |
| 5,629,919 A | 5/1997 | Hayashi et al. ............. 369/112 |
| 5,648,618 A | 7/1997 | Neukermans et al. |
| 5,666,487 A * | 9/1997 | Goodman et al. ..... 370/395.64 |
| 5,694,389 A | 12/1997 | Seki et al. |
| 5,699,463 A | 12/1997 | Yang et al. |
| 5,719,903 A | 2/1998 | Hiben et al. |
| 5,727,098 A | 3/1998 | Jacobson |
| 5,729,527 A | 3/1998 | Gerstel et al. ............... 370/228 |
| 5,745,274 A | 4/1998 | Fatehi et al. ................ 359/187 |
| 5,774,604 A | 6/1998 | McDonald |
| 5,781,537 A | 7/1998 | Ramaswami et al. ....... 370/254 |
| 5,793,746 A | 8/1998 | Gerstel et al. ............... 370/228 |
| 5,801,863 A | 9/1998 | Fatehi et al. ................ 359/124 |
| 5,825,877 A | 10/1998 | Dan et al. ...................... 380/4 |
| 5,825,949 A | 10/1998 | Choy et al. ................... 385/24 |
| 5,828,476 A | 10/1998 | Bonebright et al. |
| 5,864,643 A | 1/1999 | Pan |
| 5,867,289 A | 2/1999 | Gerstel et al. ............... 359/110 |
| 5,892,606 A | 4/1999 | Fatehi et al. ................ 359/177 |
| 5,900,968 A | 5/1999 | Srivastava et al. .......... 359/341 |
| 5,903,687 A | 5/1999 | Young et al. |
| 5,915,063 A | 6/1999 | Colbourne et al. |
| 5,942,937 A | 8/1999 | Bell |
| 5,960,132 A | 9/1999 | Lin |
| 5,963,350 A | 10/1999 | Hill |
| 5,970,201 A | 10/1999 | Anthony et al. ............. 385/140 |
| 5,978,113 A | 11/1999 | Kight ......................... 359/110 |
| 6,002,818 A | 12/1999 | Fatehi et al. ................ 385/17 |
| 6,005,993 A | 12/1999 | MacDonald ................. 385/16 |
| 6,008,915 A | 12/1999 | Zyskind ...................... 359/110 |
| 6,009,220 A | 12/1999 | Chan et al. ................... 385/24 |
| 6,046,833 A | 4/2000 | Sharma et al. .............. 359/119 |
| 6,047,331 A | 4/2000 | Medard et al. .............. 709/239 |
| 6,061,482 A | 5/2000 | Davis ......................... 385/17 |
| 6,069,924 A | 5/2000 | Sudo et al. |
| 6,072,612 A | 6/2000 | Liou et al. ................... 359/123 |
| 6,081,361 A | 6/2000 | Adams et al. ............... 359/188 |
| 6,097,858 A | 8/2000 | Laor |
| 6,097,859 A | 8/2000 | Solgaard et al. |
| 6,108,311 A | 8/2000 | Ramaswami et al. ........ 370/258 |
| 6,130,876 A * | 10/2000 | Chaudhuri ................... 370/228 |
| 6,147,968 A | 11/2000 | De Moer et al. ........... 370/225 |
| 6,148,124 A | 11/2000 | Aksyuk et al. ................ 385/24 |
| 6,160,821 A | 12/2000 | Dölle et al. |
| 6,188,810 B1 | 2/2001 | Baney ......................... 385/11 |
| 6,188,814 B1 | 2/2001 | Bhalla |
| 6,195,402 B1 | 2/2001 | Hiramatsu |
| 6,198,571 B1 | 3/2001 | Yang .......................... 359/337 |
| 6,207,949 B1 | 3/2001 | Jackel ........................ 250/227 |
| 6,252,689 B1 * | 6/2001 | Sharp ......................... 359/126 |
| 6,253,001 B1 | 6/2001 | Hoen |
| 6,272,154 B1 * | 8/2001 | Bala et al. .................. 359/127 |
| 6,295,154 B1 | 9/2001 | Laor et al. |
| 6,392,220 B1 | 5/2002 | Slater et al. |

FOREIGN PATENT DOCUMENTS

| | | | |
|---|---|---|---|
| EP | 0752794 A2 | 1/1997 | ........... H04Q/11/00 |
| EP | 0759681 A2 | 2/1997 | |
| EP | 0809384 A2 | 5/1997 | ........... H04L/29/14 |
| EP | 0 802 697 A2 | 10/1997 | |
| EP | 0857000 A2 | 1/1998 | ........... H04Q/11/00 |
| EP | 0 674 457 A3 | 5/1998 | |
| EP | 0 849 906 A2 | 6/1998 | |
| EP | 0938244 A2 | 1/1999 | ........... H04Q/11/00 |
| EP | 0 898 440 A2 | 2/1999 | |
| EP | 0910138 A1 | 4/1999 | ........... H01S/3/025 |
| EP | 0932069 A1 | 7/1999 | ............. G02F/1/09 |
| EP | 0953854 A1 | 11/1999 | ............. G02B/6/34 |
| EP | 0994635 A1 | 4/2000 | ........... H04Q/11/04 |
| EP | 0 857 000 A3 | 8/2000 | |
| EP | 1087556 A1 | 3/2001 | ........... H04B/10/21 |
| GB | 2347570 A | 3/1999 | ............. H04J/14/02 |
| WO | WO86/04205 | 7/1986 | ........... H04Q/11/02 |
| WO | WO86/05649 | 9/1986 | ........... H04Q/11/02 |
| WO | WO90/14734 | 11/1990 | ............. H04N/7/22 |
| WO | WO91/01603 | 2/1991 | ............. H04J/14/08 |
| WO | WO95/19689 | 7/1995 | ........... H04Q/11/00 |
| WO | WO97/24822 | 7/1997 | ........... H04B/10/08 |
| WO | WO98/54863 | 5/1998 | ............. H04J/14/02 |
| WO | WO99/13656 | 3/1999 | ............. H04Q/3/52 |
| WO | WO 99/18751 | 4/1999 | |
| WO | WO 99/40738 | 8/1999 | |
| WO | WO00/13210 | 9/1999 | ........... G02B/26/08 |
| WO | WO99/48323 | 9/1999 | ........... H04B/10/08 |
| WO | WO99/59272 | 11/1999 | ........... H04B/14/06 |
| WO | WO9963374 | 12/1999 | |
| WO | WO9963531 | 12/1999 | |
| WO | WO9966354 | 12/1999 | |
| WO | WO9967666 | 12/1999 | |
| WO | WO0004671 | 1/2000 | |
| WO | WO0013210 A2 | 3/2000 | |
| WO | WO0013210 A3 | 3/2000 | |
| WO | WO0020899 A2 | 4/2000 | |
| WO | WO00/20899 | 4/2000 | |
| WO | WO0020899 A3 | 4/2000 | |
| WO | WO00/30282 | 5/2000 | ............. H04J/14/02 |
| WO | WO00/52865 | 9/2000 | ............. H04J/14/02 |
| WO | WO 0007945 A1 | 2/2001 | |
| WO | WO01/28136 A1 | 4/2001 | ........... H04B/10/08 |
| WO | WO0150176 A1 | 7/2001 | |
| WO | WO0163803 A1 | 8/2001 | |
| WO | WO0171402 | 9/2001 | |

OTHER PUBLICATIONS

Optical Networks: A Practical Perspective; Rajiv Ramaswami & Kumar Sivarajan; Morgan Kaufmann Pub. 1988, pp. 152–161.

Optical Networks: A Practical Perspective; Rajiv Ramaswami & Kumar Sivarajan; Morgan Kaufmann Pub. 1998, Chapter 10, pp. 423–462.

The Photonic Switch Completes the Much–Vaunted All–Optical Network, Technology Investor, Chad White, Oct. 2000, pp. 28–31.

Operation and Maintenance for an All–Optical Transport Network, Bischoff, et al., 11/96, IEEE Communications Magazine, pp. 136–142.

Free–Space Micromachined Optical Switches with Submillisecond Switching Time for Large–Scale Optical Crossconnects, Lin, et al., 04/98, pp. 525–527.

The Optical Internet A New Network Architecture, Kaufman, et al., pp. 1–13.

All Optical Regeneration, Simon, et al., 2000 IEEE pp. 53–54.

An Economic Analysis for Core Optical Transport Networks, Peter Wong & Mark Yin,.

Experimental Study of Internet Stability and Backbone Failures, Craig Labovitz, Abha Ahuja, Farnam Jahanaian, 1999 IEEE, pp. 278–285.

Okamoto, S. et al.; "Optical Path Cross–Connect Node Architectures for Photonic Transport Network", Journal of Lightwave Technology, vol. 14, No. 6, Jun. 1996, pp. 1410–1422.

Lin, L.Y. et al.; "Micro–Electro–Mechanical Systems (MEMS) for WDM Optical–Crossconnect Networks", Milcom 1999; IEEE Miltary Communications Conf Proceedings; Atlantic City, NJ Oct. 31–Nov. 3, 1999; pp. 954–957.

Gustaffson, K. & Hok, B., A Batch–Processed Optical Scanner Proc. 12th Nordic Semiconductor, Meeting, Jevnaker (Oslo: Center for Industrial Research) pp. 282–285 (1986).

Gustaffson, K. & Hok, B., Fiberoptic Switching and Multiplexing with a Micromechanical Scanning Mirror, Digest of Technical Papers 4th Int. Conf. on Solid State Sensors and Actuators (Tokyo: Institute of Electrical Engineers of Japan) pp. 212–215 (1987).

Gustaffson, K. & Hok, B., a Silicon Light Modulator, Journal of Physics E. Scientific Instruments 21, pp. 608–5 (1998).

Lin L.Y., et al., Free–Space Micromachined Optical–Switching Technologies and Architectures, OFC/100C '99, Feb. 21–26, 1999.

Lin, L.Y., et al., Free–Space Micromachined Optical–Switching Technologies and Architectures, OFC/100C '99, Feb. 21–26, 1999.

Laor, H., et al., Performance of a 576 × 576 optical cross connect, NFOEC–99.

A. Himeno, R. Nagase, T. Ito, K. Kato and M. Okuno; Photonic Inter–Module Connector Using 8×8 Optical Switches for Near–Future Electronic Switching Systems.

IEICE Transactions on Communications; E77–B(1994) Feb., No. 2, Tokyo, JP.

* cited by examiner

METHOD AND APPARATUS FOR SIGNALING BETWEEN AN OPTICAL CROSS-CONNECT SWITCH AND ATTACHED NETWORK EQUIPMENT

CROSS REFERENCE TO RELATED APPLICATIONS

This non-provisional U.S. Patent Application claims the benefit of U.S. Provisional Patent Application No. 60/162,936 entitled "OPTICAL CROSSCONNECT WITH OPTICAL TO ELECTRICAL CONVERTERS" filed on Nov. 2, 1999 by inventor Rajiv Ramaswami; and also claims the benefit of U.S. Provisional Patent Application No. 60/170,094 entitled "OPTICAL CROSSCONNECT WITH BRIDGING, TEST ACCESS AND REDUNDANCY" filed on Dec. 10, 1999 by inventors Rajiv Ramaswami and Robert R. Ward; and also claims the benefit of U.S. Provisional Patent Application No. 60/170,095 entitled "OPTICAL CROSSCONNECT WITH LOW-LOSS BRIDGING, TEST ACCESS AND REDUNDANCY" filed on Dec. 10, 1999 by inventors Steven Clark and Rajiv Ramaswami; and also claims the benefit of U.S. Provisional Patent Application No. 60/170,093 entitled "1+1 OPTICAL PROTECTION USING OPTICAL CROSSCONNECT" filed on Dec. 10, 1999 by inventors Rajiv Ramaswami and Robert R. Ward; and also claims the benefit of U.S. Provisional Patent Application No. 60/170,092 entitled "SIGNALING INTERFACE BETWEEN OPTICAL CROSSCONNECT AND ATTACHED EQUIPMENT" filed on Dec. 10, 1999 by inventor Rajiv Ramaswami; and also claims. the benefit of U.S. Provisional Patent Application No. 60/186,108 entitled "1:N PROTECTION BETWEEN CLIENTS AND ALL-OPTICAL CROSSCONNECTS" filed on Mar. 1, 2000 by inventors Kent Erickson, Subhashini Kaligotla, and Rajiv Ramaswami which is incorporated herein by reference; and also claims the benefit of U.S. Provisional Patent Application No. 60/200,425 entitled "OPTICAL CROSSCONNECT SYSTEM" filed on Apr. 28, 2000 by inventors Rajiv Ramaswami, Steve Tabaska, and Robert Ward which is incorporated herein by reference.

BACKGROUND OF THE INVENTION

Over the last few years, the demand for high-speed communication networks has increased dramatically. In many situations, communication networks are implemented with electrical interconnections. That is the interconnections between nodes and networks are made using electronic circuitry such as a transistor switch which blocks or passes electrons. One type of electrical interconnection is an electronic network switch which is well known. The application of electronic network switches to local area networks (LANs), metropolitan area networks (MANs) and wide area networks (WANs) is also well know. A network switch may stand alone or be used in conjunction with or incorporated into other network equipment at a network node. As desired levels of bandwidth and transmission speed for communication networks increase, it will become more difficult for the electrical interconnections to satisfy these levels.

One difficulty associated with electrical interconnections is that they are sensitive to external electromagnetic interference. More specifically, electromagnetic fields that reside in the vicinity of the interconnection lines induce additional currents, which may cause erroneous signaling. This requires proper shielding, which hampered general heat removal.

Another difficulty is that electrical interconnections are subject to excessive inductive coupling, which is referred to as "crosstalk". To alleviate crosstalk, the electrical interconnections must be shielded or abide by fundamental rules of circuit routing so that they are set at a distance large enough to prevent neighboring signals from having any adverse effect on each other, which would reduce network performance.

In lieu of electrical interconnections switching electrons or a voltage and current, optical interconnections offer a solution to the difficulties affecting conventional electrical interconnections. Optical interconnections switch photons or light ON and OFF at one or more wavelengths to provide signaling. An advantage to optical interconnections is that they are not as susceptible to inductive or even capacitive coupling effects as electrical interconnections. In addition, optical interconnections offer increased bandwidth and substantial avoidance of electromagnetic interference. This potential advantage of optics becomes more important as the transmission rates increase and as the strength of mutual coupling associated with electrical interconnections is proportional to the frequency of the signals propagating over these interconnections.

Albeit local or global in nature, many communications network features electronic switching devices to arbitrate the flow of information over the optical interconnections. Conventional electronic switching devices for optical signals are designed to include a hybrid optical-electrical semiconductor circuit. employing photodetectors, electrical switches, optical modulator or lasers. The incoming optical signals are converted to electrical signals by photodetectors. The electrical signals are amplified and switched by electronic switches to the appropriate output and then converted into optical signals by lasers. One disadvantage associated with a conventional electronic switching device is that it provides less than optimal effectiveness in supporting high data transmission rates and bandwidth.

An alternative approach is to develop an all optical, scalable cross-connect system which performs switching operations of light pulses or photons (referred to generally as "light signals") without converting and reconverting signals between the optical domain to the electrical domain. However, switching light or photonic signals is different and introduces additional challenges over conventional electrical switching. One of these challenges is fault protection.

Another challenge to an all optical cross-connect system, is generating status information regarding the data transmission status of the light or optical signals through the optical cross-connect. This is a challenge because the light or optical signals are not in an electrical form in an all optical cross-connect and the data format and the data rate of individual channels is unknown to an all optical cross-connect. Each and every channel can have the light pulses converted into electrical pulses for monitoring but this is an expensive solution which requires an optical to electrical converter for each and every channel.

SUMMARY OF THE INVENTION

The present invention is briefly described in the claims that follow below.

Briefly, the present invention provides methods, apparatus and systems for signaling information between an optical cross-connect switch and attached network equipment. In one embodiment, an out-of-band signaling interface between an optical cross-connect switch and attached network equipment is realized by using an out-of-band communication channel over a network. In another embodiment, a decentralized signaling interface is provided by one or more dedicated signal lines between an optical cross-connect switch and attached network equipment. The one or more dedicated signal lines can be formed by using low-cost multimode (MM) optical fibers or by using low cost electrical wire links.

BRIEF DESCRIPTION OF THE DRAWINGS

The features and advantages of the present invention will become apparent from the following detailed description of the present invention in which.

Like reference numbers and designations in the drawings indicate like elements providing similar functionality. A letter or prime after a reference number designator represents another or different instance of an element having the reference number designator.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

In the following description, certain terminology is used to describe various features of the present invention. For example, a "module" includes a substrate normally formed with any type of material or materials upon which components can be attached such as a printed circuit board or a daughter card for example. Examples of a "component" include an optical switch, a processing unit (e.g., Field Programmable Gate Array "FPGA", digital signal processor, general microprocessor, application specific integrated circuit "ASIC", etc.), splitters and the like. A "splitter" is an optical component that performs a bridging operation on an input light signal by splitting that light signal into two or more output light signals. Each module features one or more interfaces to transport information over a link. A "link" is broadly defined as one or more physical or virtual informationcarrying mediums that establish a communication pathway such as, for example, optical fiber, electrical wire, cable, bus traces, wireless channels and the like. "Information" can be voice, data, address, and/or control in any representative signaling format such as light signals (e.g., light pulses or photons).

I. General Architectural Overview

Figure 1:
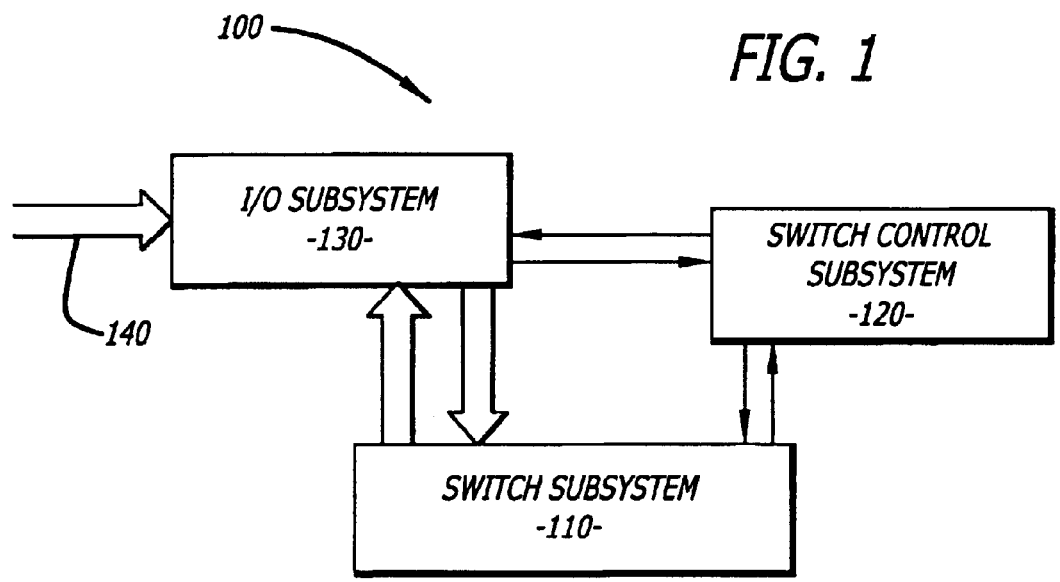
FIG. 1 is a simplified overview of an embodiment of an optical cross-connect switching system.

Referring to FIG. 1, an exemplary embodiment of a simplified overview of an optical cross-connect switching system 100 is shown. Herein, the optical cross-connect switching system 100 comprises three basic units: a switch subsystem 110, a switch control subsystem 120 and an input/output (I/O) subsystem 130. In one embodiment, the modular architecture of the switch subsystem 110, by a method of having replaceable optical switch cores, provides for switch subsystem maintenance in the event of failure within the switch subsystem 110. It is conceivable that further modularity could be achieved by having replaceable subsections within, thus providing for switch matrix maintenance in the event of failure within a switch matrix itself. The modular architecture of both the switch control subsystem 120 and the I/O subsystem 130, each handling a small number of I/O ports in the system 100, provides scalability to the optical cross-connect switching system 100. Thus, additional I/O ports may be subsequently added to the optical cross-connect switching system 100 by adding or removing input/output (I/O) port modules (described below).

The switch subsystem 110 includes optical switches for routing light signals. In one embodiment, the optical switches forming the switch subsystem 110 are micro-machined mirrors; however, it is contemplated that other switch fabrics may be used such as liquid crystal technology. The I/O subsystem 130 receives external light signals 140 and transfers these signals to the switch subsystem 110. The switch control subsystem 120 controls the configuration of the switch subsystem 110 (e.g., mirror orientation) and performs certain monitoring functions. The interconnectivity between the switch subsystem 110, the switch control subsystem 120 and the I/O subsystem 130 includes redundancy so that no equipment failures would cause complete disablement of the system 100.

Figure 2:
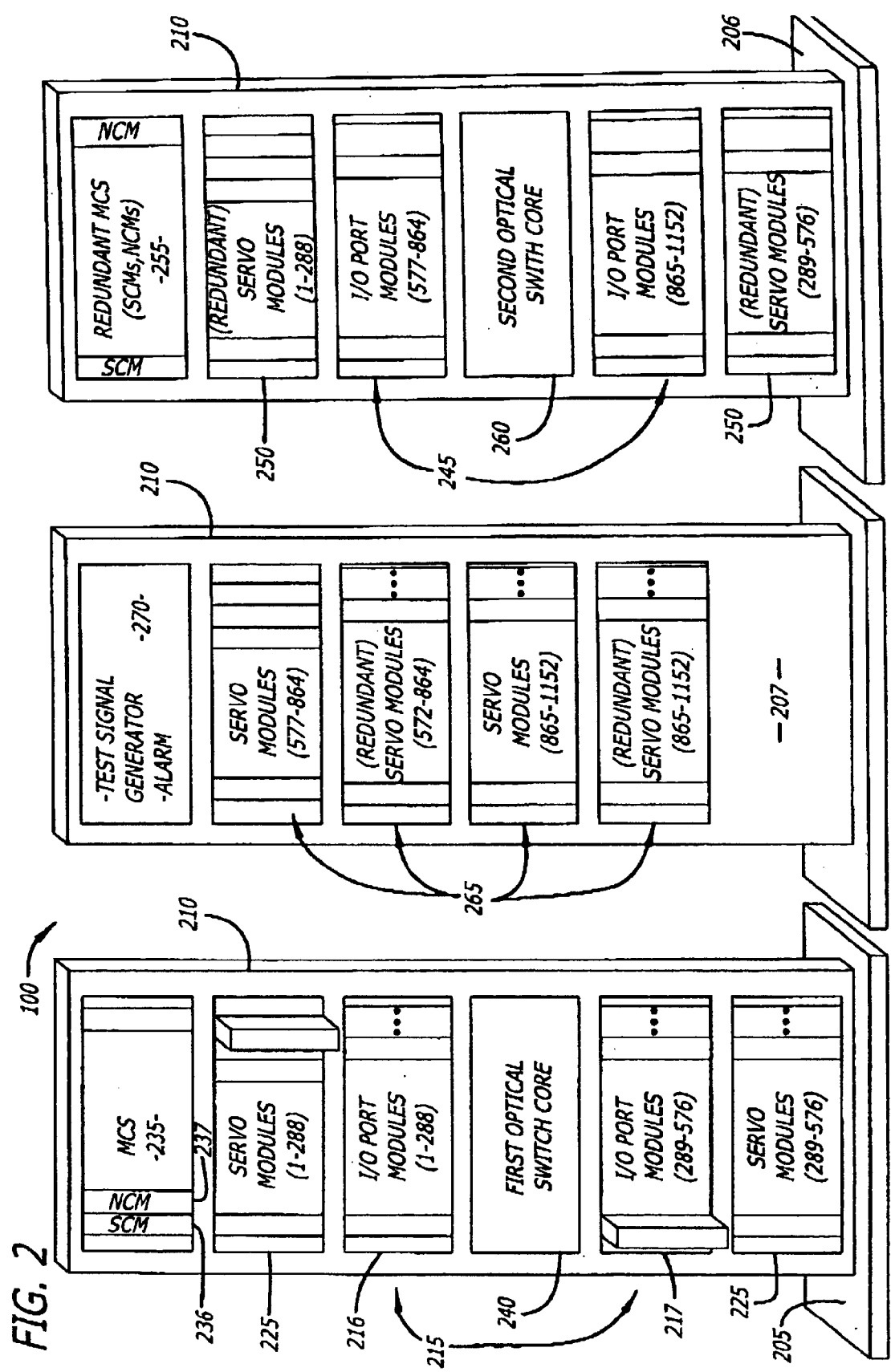
FIG. 2 is a first exemplary embodiment of an optical cross-connect switching system of FIG. 1.

Referring now to FIG. 2, a first exemplary embodiment of an optical cross-connect switching system 100 is shown. In general, the optical cross-connect switching system 100 is a matrix-based optical cross-connect with associated I/O port modules. More specifically, the optical cross-connect switching system 100 is collectively formed by a plurality of platforms 205, 206 and 207 in communication with each other, although the implementation of the switching system 100 as a single platform is another embodiment. Herein, each platform 205, 206 and 207 includes a frame 210 (e.g., a rack) that physically supports I/O port modules forming the I/O subsystem 130 as well as servo modules, servo control modules and/or network control modules of the switch control subsystem 120. The modules are arranged either horizontally or vertically within each platform 205, 206 and 207 and can be individually removed or installed without interfering with immediately adjacent modules. In addition, the frame 210 may also physically support one or more optical switch cores, which may also generally be referred to as "switch fabric," of the switch subsystem 110.

As shown in this embodiment, the first platform 205 comprises (i) a plurality of I/O port modules 215 associated with the I/O subsystem 130 of FIG. 1, (ii) a plurality of servo modules 225 and a management control subsystem (MCS) 235 associated with switch control subsystem 120 of FIG. 1, and (iii) a first (primary) optical switch core 240 associated with switch subsystem 110 of FIG. 1. Similarly, the second platform 206 comprises a plurality of additional I/O port modules 245, a plurality of (redundant) servo modules 250, a management control subsystem 255, and a second (redundant) optical switch core 260. The third platform 207 comprises a plurality of servo modules 265 that control various mirrors of the first and second optical switch cores 240 and 260, which correspond to additional ports associated with I/O port modules 245. Additionally, a light path test signal generator(s), a light path signal monitor(s), circuit breakers and/or alarm visual indication 270 may be located within the third platform 207. For clarity, the elements forming the first platform 205 are described since these elements may be found in the second and/or third platforms 206 and 207.

Figure 3:
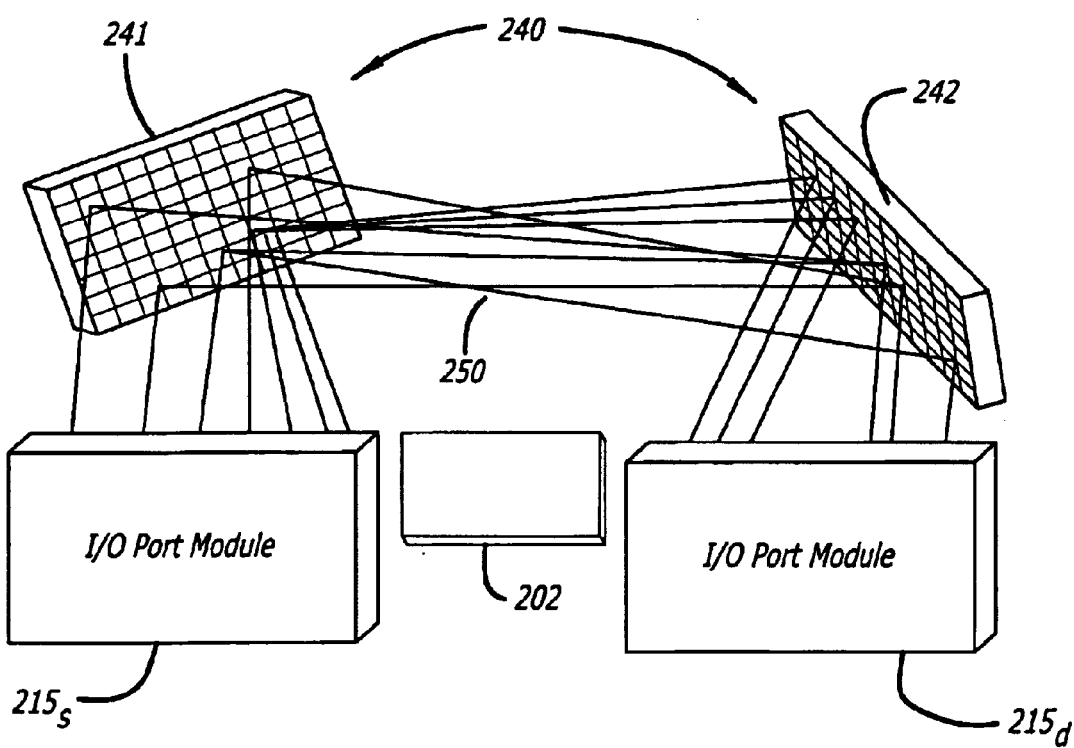
FIG. 3 is an exemplary embodiment of the optical fiber switch matrices forming an optical fiber switch fabric of FIG. 2.
Figure 4:
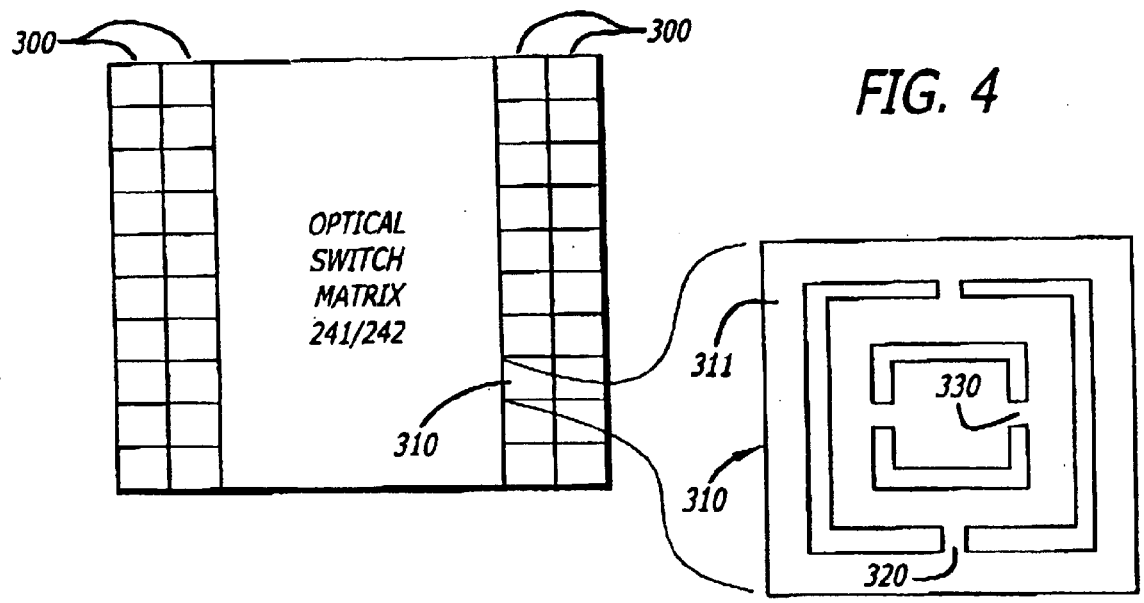
FIG. 4 is an exemplary embodiment of mirror arrays forming an optical fiber switch matrix of FIG. 3.

As shown in both FIGS. 2–4, the first optical switch core 240 includes a first optical switch matrix 241 and a second optical switch matrix 242. These matrices 241 and 242 are collectively positioned to route light signals 250 between a port of a source I/O port module $215_s$ ("s" is a positive whole number) and a port of a destination I/O port module $215_d$ ("d" is a positive whole number), both modules located in any of the platforms 205, 206 and 207 as shown in detail in FIG. 3. Although a two-bounce routing technique is shown, it is contemplated that other light routing techniques may be used including a three-bounce routing technique in which a second bounce mirror 202 optionally shown in FIG. 3 is positioned to assist in routing light signals from one optical switch matrix to another.

As shown in FIG. 4, one embodiment for each of the optical switch matrices 241 and 242 includes multiple arrays 300 of micro-machined mirrors. Each mirror (e.g., mirror 310) features a mirrored surface 311 and torsional flexures 320 and 330 that enable the mirror 310 to adjust its physical orientation to reflect incoming light signals in any selected direction. Herein, both the first and second optical switch matrices 241 and 242 include Q micro-machined mirrors, where "Q" is less than or equal to the maximum number of I/O ports that can be supported by the optical cross-connect switching system 100. For this embodiment, "Q" is greater than or equal to 64 but less than or equal to 1152 ($64 \leq Q \leq 1152$. However, the present invention is not limited to any maximum number of mirrors or I/O ports. It is contemplated, however, that the number of mirrors employed within the first and second optical switch matrices 241 and 242 may differ.

Figure 6:
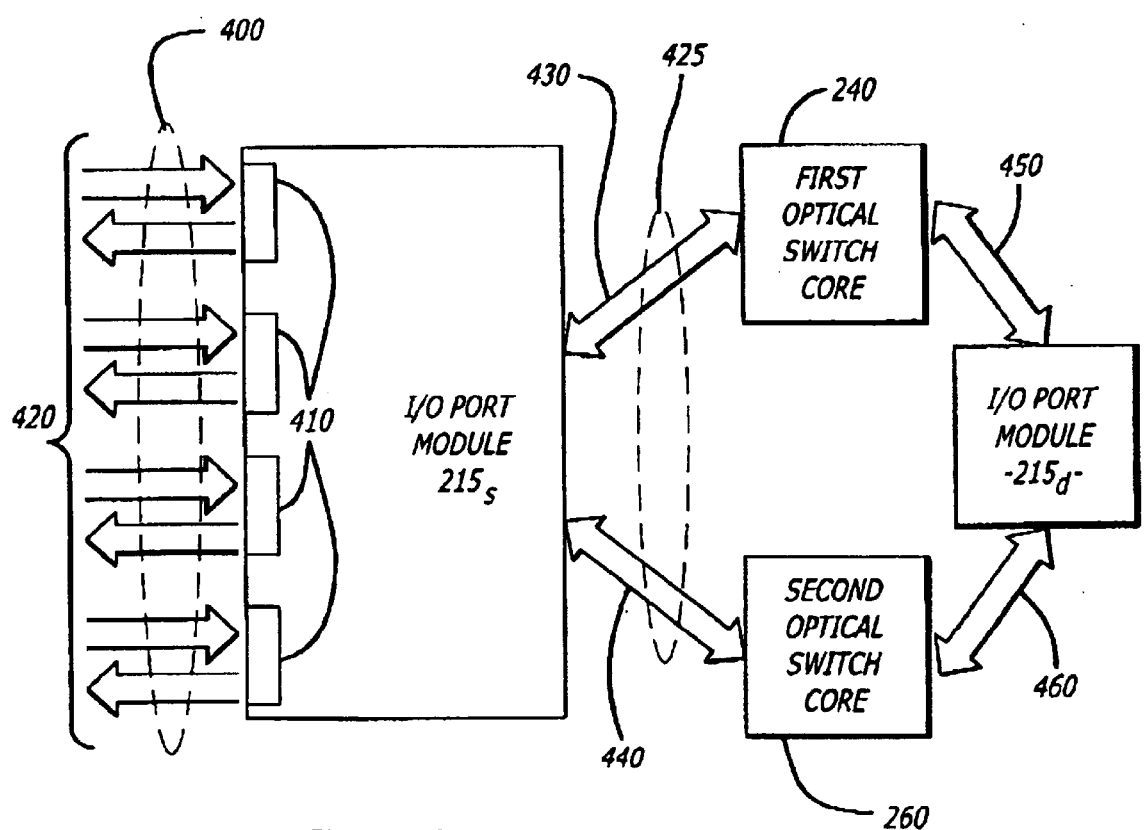
FIG. 6 is an exemplary embodiment of a data path for the transfer of light between I/O port modules and multiple fiber optical switch fabrics of FIG. 2.
Figure 5:
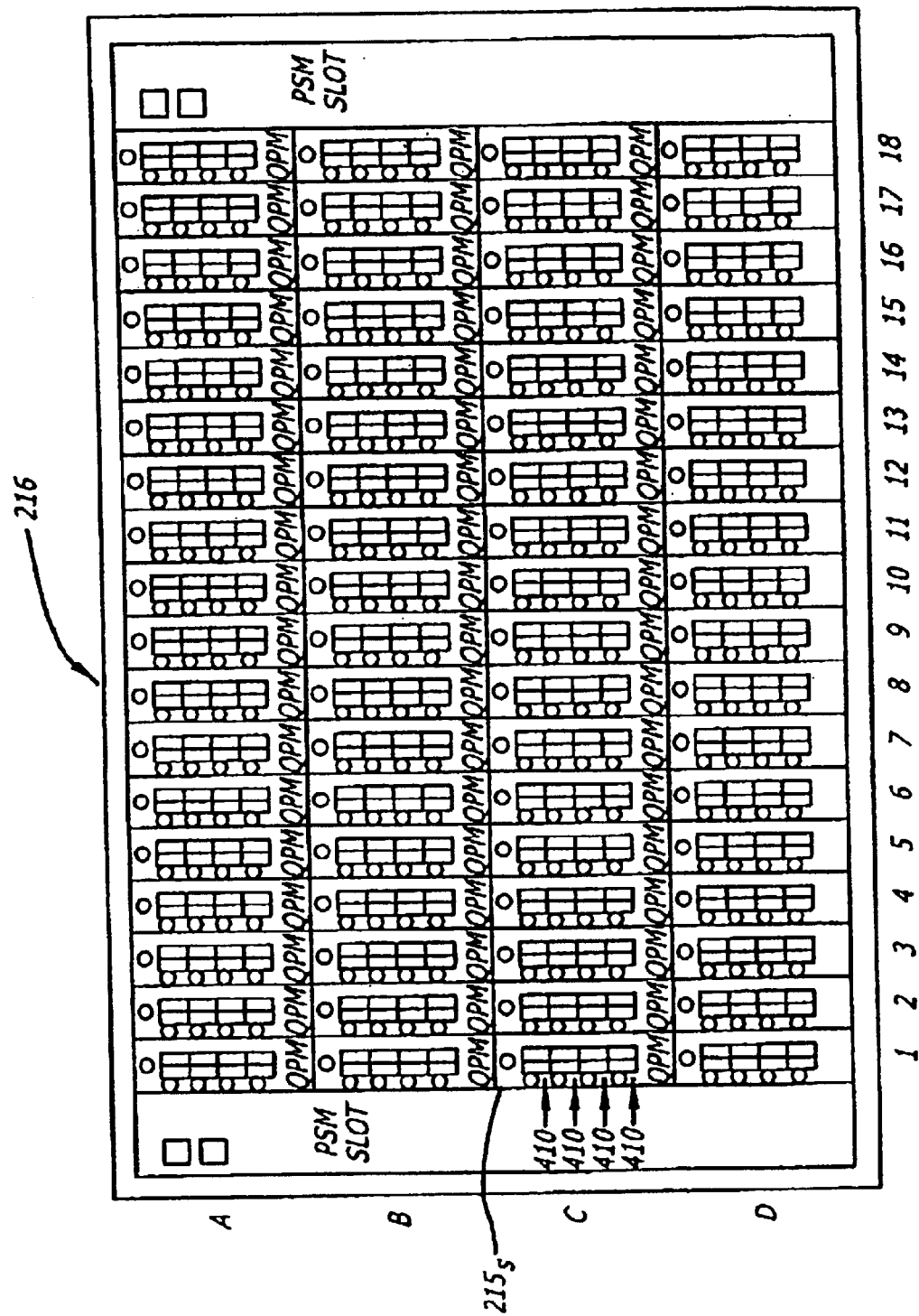
FIG. 5 is an exemplary embodiment of an I/O subsystem featuring a plurality of I/O port modules.

As generally shown in FIGS. 2, 5 and 6, the plurality of I/O port modules 215 features two groups 216 and 217 of I/O port modules. Each group, such as group 216 or 217 for instance, includes up to seventy-two (72) quad-port I/O port modules as shown in FIG. 5 that receive power from one or more power supply modules denoted herein as "PSM". The components forming an I/O port module is described below and shown in FIGS. 8 and 9. Thus, each I/O port module, such as I/O port module $215_s$ for example, features an external interface 400 for a plurality of I/O ports 410 (e.g., four I/O ports). An I/O port 410 features a duplex socket that is adapted to receive a duplex pair of optical fiber links, one optical fiber link routes a light signal to the I/O port 410 while the other routes light signals from the I/O port 410. This support bi-directional optical connections. There is a small percentage (e.g., less than 15%) of these I/O ports, however, that may be assigned as test access ports as described below.

Moreover, as shown in FIG. 6, upon receiving an incoming light signal over an optical fiber link 420, the I/O port module $215_s$ performs a bridging operation by splitting the incoming light signal into multiple (two or more) bridged light signals for routing to the first and second optical switch cores 240 and 260. The bridged light signals are routed through an internal optical interface 425 featuring optical fiber ribbon links 430 and 440. For this embodiment, the "optical fiber ribbon links" are ribbon cables having multiple optical fiber lines (e.g., two lines from each I/O port). The first optical switch core 240 provides a primary optical path. The second optical switch core 260 provides a redundant optical path in the event the first optical switch core 240 is not operating properly. The optical switch cores 240 and 260 route the bridged light signals to a selected port of a destination I/O port module (e.g., I/O port module $215_d$) via optical fiber ribbon links 450 and 460.

Figure 7:
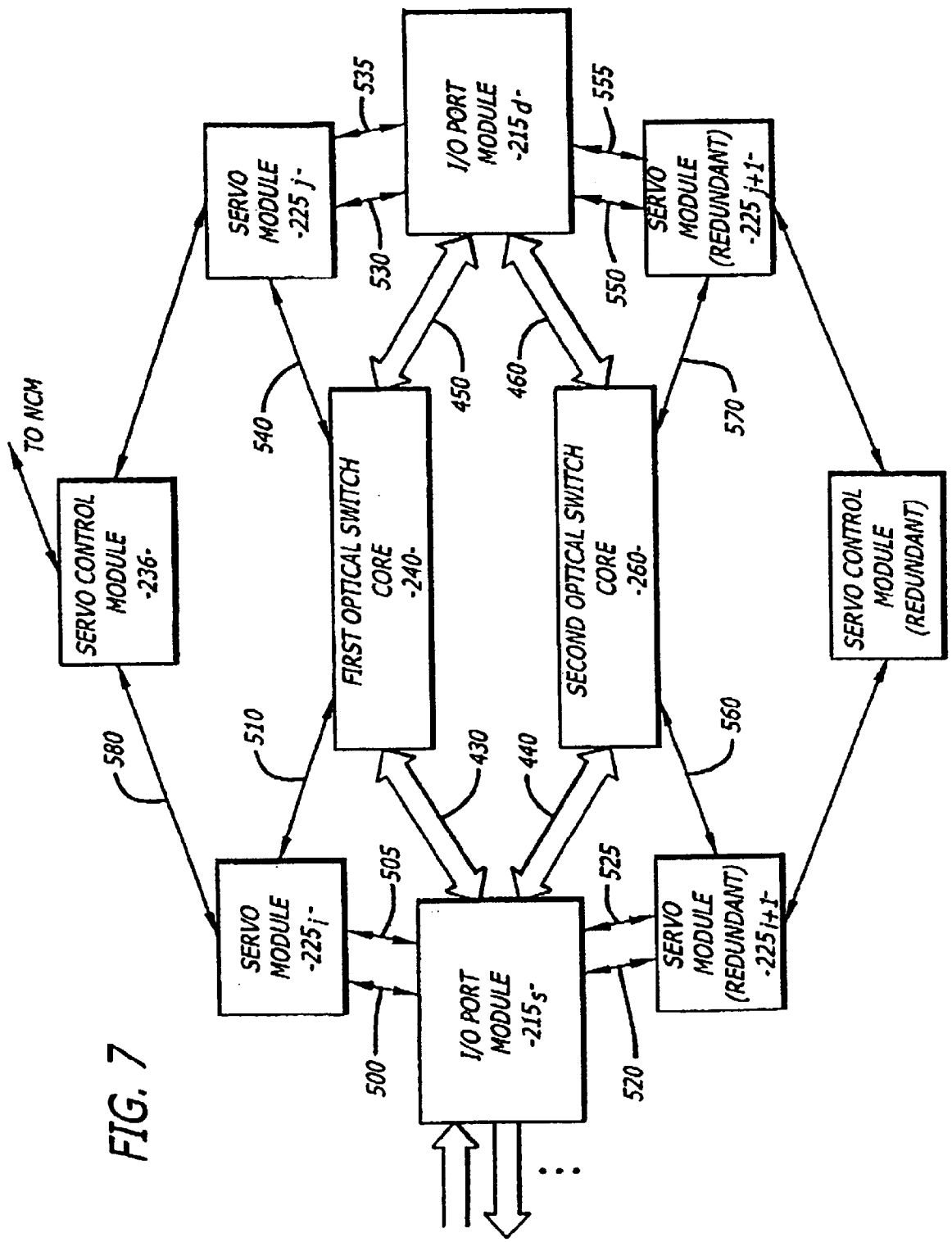
FIG. 7 is an exemplary embodiment of a control path featuring the interconnections between the I/O port module and servo modules.

Upon receiving light signals from both the first and second optical switch cores 240 and 260, the I/O port module $215_s$ provides small percentage optical tap signals of the received light paths to the respective servo modules, which in turn determine light signal quality. The respective servo modules will convey light signal quality for each respective light path to the I/O port module, using a digital protocol over an electrical communication link 505 to the I/O port module as shown in FIG. 7. The I/O port module $215_s$ will in turn, determine (i.e. select) which light signal has the higher signal quality and outputs that signal via interface 400. In most cases, the signal quality of the two light paths presented to the I/O port module will be of the same signal quality and may have a relatively low optical loss of approximately seven decibels (7 dB) or less.

Referring now to FIGS. 2 and 7, each servo module 225 is configured to receive optical tap signals from one or more I/O port modules. Herein, servo module $225_i$ is configured to receive optical tap signals via link 500 from I/O port module $215_s$. These optical tap signals provide feedback to indicate a percentage of the bridged light signals and also allow for light to be injected under certain conditions. In response to receiving optical tap signals via link 500, the servo module $225_i$ provides mirror control signals over link 510 to the first optical switch core 240. The mirror control signals are routed via a unique communication path to an optical switch (e.g., a micro-machined mirror) and are associated with the port of the I/O port module $215_s$ through which the incoming light signal was routed. The mirror control signals are used for proper adjustment of the physical orientation of the mirror.

The I/O port module 215d provides optical tap signals over link 530 to servo module $225_j$. In response to receiving the optical tap signals from I/O port module $215_d$, the servo module $225_j$ provides mirror control signals via link 540 to the first optical switch core 240. The mirror control signals are routed via a unique communication path to a micromachined mirror associated with a selected port of the I/O port module $215_d$ from which the light signal would be output. Herein, sensing the optical tap (feedback) signals, the servo module $225_j$ determines the light signal quality and conveys light signal quality information for each light path using a digital protocol over (electrical) link 535. Thereafter, the I/O port module 215d chooses the selected port (i.e. port having the best light signal quality).

Collectively, the optical tap signals, mirror control signals and light signal quality information, which are routed over links 500, 510, 530, 540, 505 and 535, are used by servo modules $225_i$ and $225_j$ for adjustment of the physical orientation of mirrors to make a connection between I/O port module $215_s$ and $215_d$.

Additionally, I/O port modules $215_s$ and $215_d$ also transfer optical tap signals via links 520 and 550, respectively. Similar to the above description, these optical tap signals establish the redundant optical path by altering the physical orientation of one or more micro-machined mirrors of the second optical switch core 260 using mirror control signals over links 560 and 570 and light signal quality information via links 525 and 555.

Figure 11:
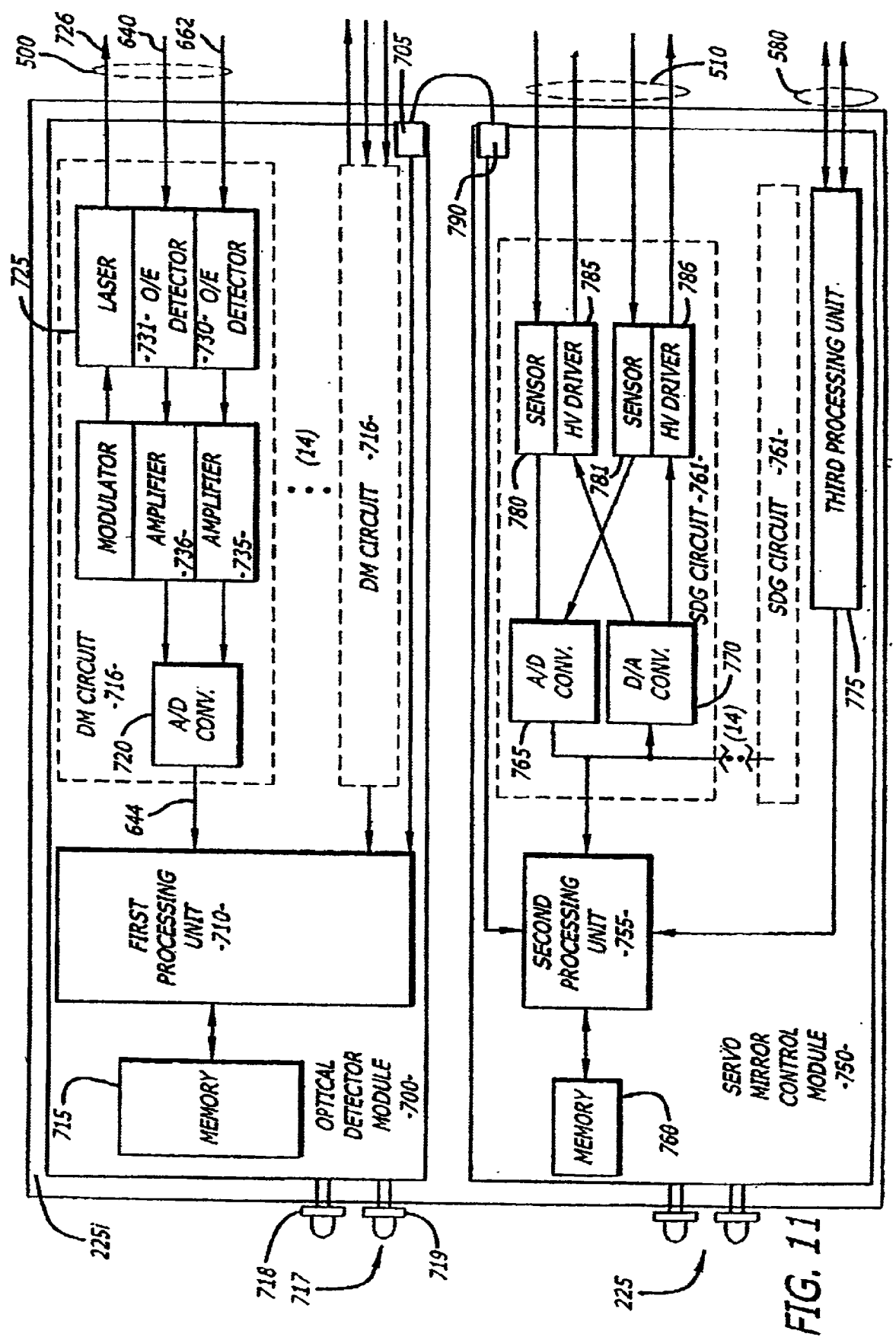
FIG. 11 is an exemplary embodiment of a servo module of the optical cross-connect switching system of FIG. 1.

In the event that no optical power is presented to the I/O port module $215_s$, a substitute light signal may be injected from the servo module $225_i$ via link 500. An alignment laser may be used as shown in FIG. 11 described below. This process of light substitution allows for connection establishment and verification when no input light is present to the I/O port module $215_s$. The substitute light source can be within the same wavelength range (e.g. 1100 nanometers "nm"–1700 nm) as the allowed input light signal range. In one embodiment, the light source or method of injection would be chosen to not interfere with attached equipment's select operational wavelength range. Choosing a different wavelength source on the servo module and/or a wavelength specific splitter and/or filter on the I/O port module could do this particular embodiment.

The management control subsystem 235 (see FIG. 2) enables communications between two or more servo modules placed within the same or different platforms. The management control subsystem 235 includes at least one servo control module 236 and an optional network control module 238. In one embodiment, the servo control module (SCM) 236 ensures communication between at least servo modules $225_i$ and $225_j$ that control mirrors associated with the first optical switch core 240. The network control module (NCM) 238 manages the execution of connection configurations for the whole cross-connect switching system and ensures communications between multiple servo control modules 236 and 237. The same architecture is used to control optical switches within the second optical switch core 260 as shown.

II. General Architecture of the I/O Port Modules

Figure 8:
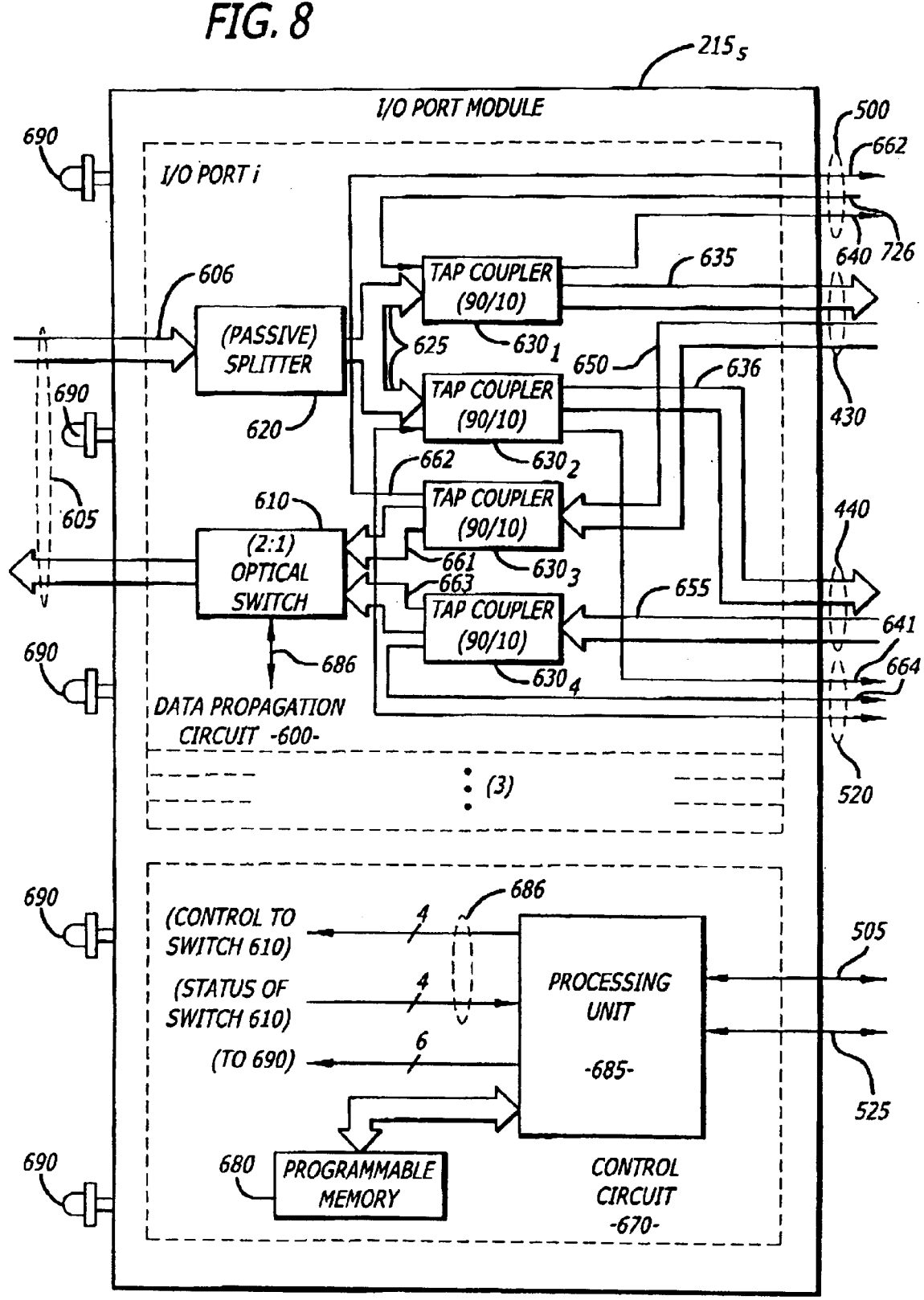
FIG. 8 is an exemplary embodiment of the I/O port module of FIGS. 6 and 7 illustrating a data propagation circuit and a control circuit.
Figure 9:
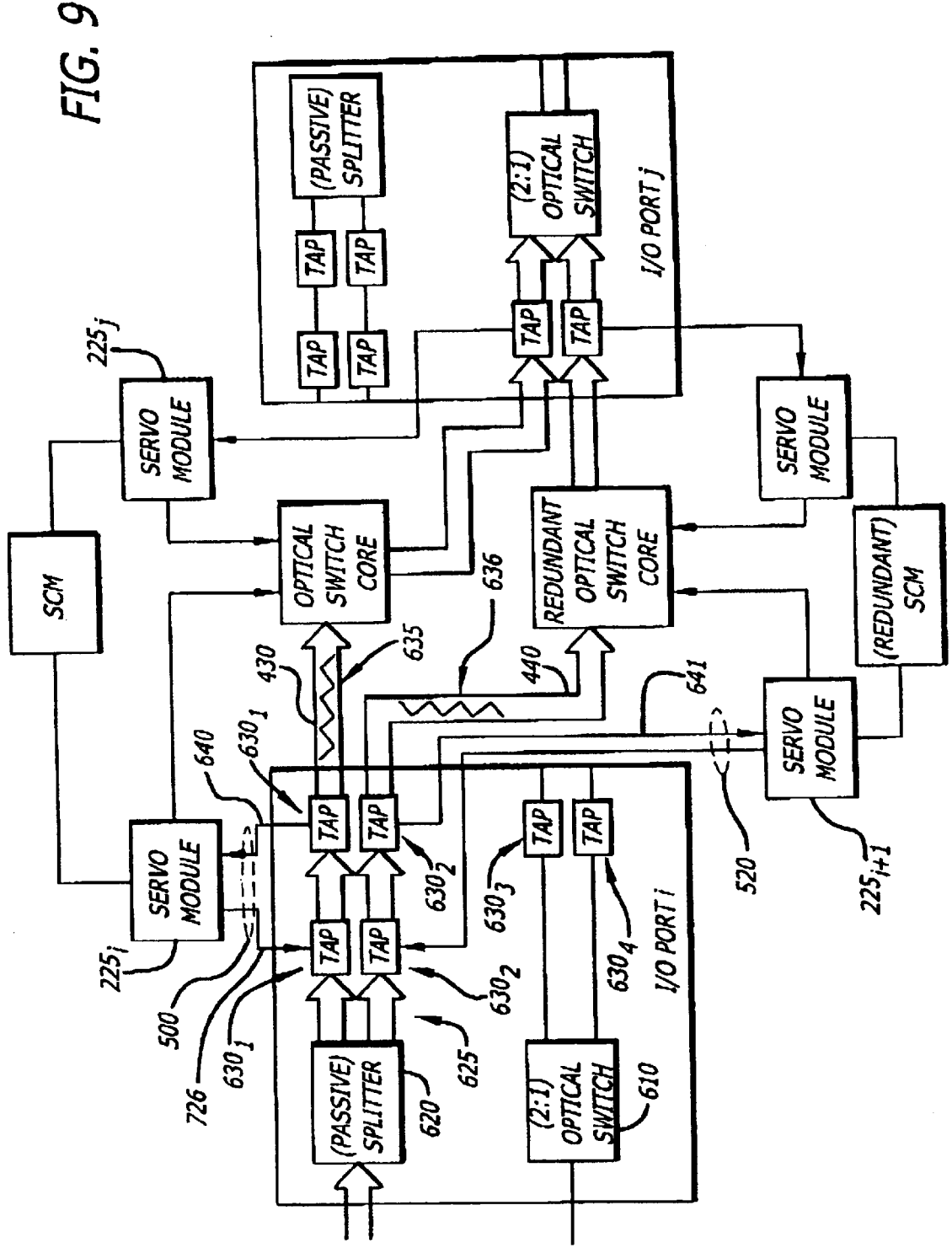
FIG. 9 is an exemplary embodiment of multiple ports of I/O modules in communication with optical switches controlled by servo modules.

Referring now to FIGS. 8 and 9, an exemplary embodiment of an I/O port module (e.g., I/O port module $215_s$) and its communications over optical switch cores 240 and 260 is shown. I/O port module $215_s$ includes a data propagation circuit 600 for each I/O port and a control circuit 670. Thus, in the event that the I/O port module $215_s$ is configured with four I/O ports, four data propagation circuits are implemented on the I/O port module $215_s$ as represented. Only the data propagation circuit 600 for one of the I/O ports of I/O port module $215_s$ (e.g., $i^{th}$ I/O port) is shown in detail for clarity sake.

In one embodiment, the data propagation circuit 600 comprises an optical switch 610, a (passive) splitter 620 and a plurality of tap couplers $630_1$–$630_4$. The plurality of tap couplers $630_1$–$630_4$ correspond to the pairs of optical fibers found in optical fiber ribbon links 430 and 440. The control circuit 670 comprises a programmable memory 680, a processing unit 685 and status identification components 690.

As shown, each port of the I/O port module $215_s$ supports full-duplex communications. Thus, an incoming light signal 606 received over port 605 is routed to the splitter 620. The splitter 620 effectively performs a bridging operation by splitting the incoming light signal 606 into bridged light signals 625, which collectively have the same power level (energy) as the light signal 606. In one embodiment, when the splitter 620 is a 50/50 splitter, the bridged light signals 625 have equal power levels. However, it is contemplated that splitter 620 may produce bridged light signals 625 having disproportionate power levels.

The bridged light signals 625 are routed through the tap couplers $630_1$ and $630_2$. Attached to servo module $225_i$ and servo module $225_{i+1}$ via optical tap links 500 and 520, the tap couplers $630_1$ and $630_2$ are used to monitor the power level of light signals 635 and 636 propagating through optical fiber ribbon links 430 and 440 (referred to as "outgoing light signals"). This enables the servo modules $225_i$ and $225_{i+1}$ to verify the connectivity of the splitter 620 to optical fiber ribbon links 430 and 440 and to detect unacceptable variances in optical performance of the light signal. As shown for this embodiment, the tap couplers $630_1$ and $630_2$ may separate the bridged light signals into signals having disproportionate power levels in order to maximize the power levels of the outgoing light signals propagating through optical fiber ribbon links 430 and 440. For example, where the tap couplers $630_1$ and $630_2$ may operate as 90/10 splitters, the outgoing light signals 635 and 636 have ninety (90%) of the total power level of the bridged light signal while the tap optical signals 640 and 641 have only ten percent (10%).

Referring to FIG. 8, tap couplers $630_3$ and $630_4$ are configured to receive incoming light signal 650 and 655 via optical fiber ribbon links 430 and 440, respectively. The tap couplers $630_3$ and $630_4$ effectively separate the light signals 650 and 655 into corresponding pairs of light signals having disproportionate power levels (e.g., signals 661, 662 and 663, 664). Signals 662 and 664 having the lower power level are provided to the servo module $225_i$ and servo module $225_{i+1}$ via links 500 and 520 for monitoring the power levels of the light signals 661 and 663, without the light signals 661 and 663 experiencing substantial signal degradation. The signals 662 and 664 may be light signals that undergo O/E conversion at the I/O port module $215_s$ or at the servo modules $225_i$ and $225_{i+1}$ as shown in FIG. 11. The tap couplers $630_3$ and $630_4$ are shown as 90/10 splitters; however, tap couplers $630_3$ and $630_4$ may be any selected ratio, including 50/50.

The light signals 661 and 663 are routed to the optical switch 610 of a destined I/O port. The control circuit 650 on the I/O port module $215_s$ determines which of the pair of light signals 661 and 663 has the best signal quality based on conveyed light signal quality information from the servo modules via links 505 and 525 as briefly described below. Parameters used to determine light signal quality include measured optical signal intensity/power, extinction ratio, and the like. The light signal quality information to the I/O port module may be conveyed as failed due to the servo module service operations, high bit error rate, an external light path has failed, and the like. The light signal 661 or 663 with the best signal quality is output through the I/O port 605. Of course, it is contemplated that the light signal output operations described for I/O port i are applicable to I/O port j as shown.

Figure 10:
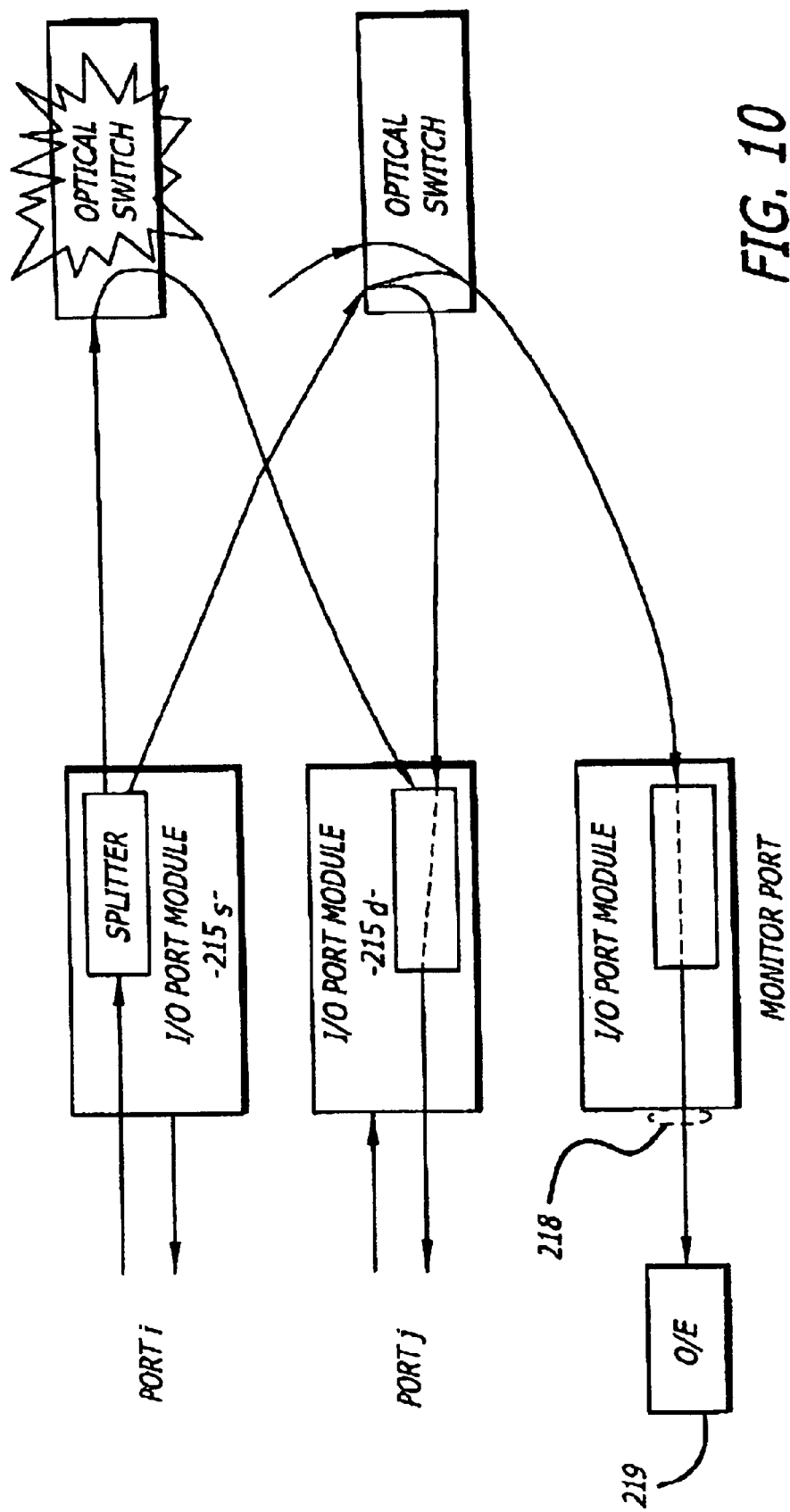
FIG. 10 is an exemplary embodiment of an I/O port configured as a test access port.

It is contemplated that an I/O port of the I/O port module $215_s$ may be configured as a test access port. A "test access port" is an I/O port that is used for monitoring light signals routed through another port. Normally, the test access port receives a portion of the power level of a light signal routed through a selected optical switch (e.g., micro-machined mirror). For example, as shown in FIG. 10, an I/O port 218 of the I/O port module $215_s$ is configured for coupling with a monitoring device 219 (e.g., a bit error rate "BER" monitor in combination with an optical-electrical "O/E" converter, etc.) to monitor a power level of a light signal routed to the $i^{th}$ I/O port from an optical switch.

Referring back to FIG. 8, the control circuit 670 comprises the programmable memory 680 in communication with the processing unit 685 (e.g., FPGA). The programmable memory 680 contains software and other information used by the processing unit 685 to provide selection of the best quality signal based on digital electrical signaling from servo module $225_i$ and servo module $225_{i+1}$ over links 505 and 525, respectively. Also, programmable memory 680 includes information used by the processing unit 685 to control the state of the status identification components 690 (e.g., light emitting diodes "LEDs"). The state of the status identification components 690 identifies (1) whether each I/O port is operational and/or (2) whether the I/O port module is operational. The processing unit 685 is further in communications with optical switches of each data propagation circuit employed in the I/O port module $215_s$ in order to receive switch status signals and provide switch control signals. As shown for clarity, processing unit 685 provides optical switch 610 with switch control signals for receiving switch status signals and selecting either light signal 661 or light signal 663.

III. General Architecture of the Servo Modules

Referring now to FIG. 11, an exemplary embodiment of the servo module (e.g., servo module $225_i$) is shown. In one embodiment, the servo module $225_i$ comprises two separate modules in communication over connectors 705 and 790. These separate modules are referred to as an "optical detector module" 700 and a "servo mirror control module" 750.

The optical detector module 700 comprises a first processing unit 710, memory 715, a plurality of detection/modulation (DM) circuits 716 and status identification components 717. As shown, the optical detector module 700 features sixteen (16) DM circuits 716 to support four (4) quad-port I/O port modules. Each DM circuit 716 includes an analog-to-digital (A/D) converter 720, a laser 725, optical-electrical (O/E) detectors 730 and 731, and optional amplifiers 735 and 736.

The servo mirror control module 750 comprises a second processing unit 755, a memory 760, a plurality of mirror signal detection and generation (SDG) circuits 761, a third processing unit 775 and status identification components 795. The SDG circuits 761 correspond in number to the DM circuits 716 of the optical detector module 700. Each SDG circuit 761 features an A/D converter 765, a digital-to-analog (D/A) converter 770, hinge position sensors 780–781 and high voltage (HV) mirror drivers 785–786.

As shown in FIG. 11, the optical detector module 700 is removably coupled to the servo mirror control module 750. This allows the optical detector module 700 to be "hot swapped" from a backplane, which features connectors 705 and 790 connecting the optical detector module 700 to the servo mirror control module 750, without disrupting the servo mirror control module's 750 ability to hold the mirrors in their existing positions for an extended period of time. This "hot swapping" of the optical detector module 700 allows for repair or upgrade of the optical detector module 700. Optical detector module 700 receives optical tap (feedback) signals 640 and 662 from one or more I/O port modules (e.g., I/O port module $215_s$ via link 500) and can transmit optical control signals 726 from the laser 725 for alignment of light signals transferred between two I/O port modules. The optical tap signal 640 is based on an input light signal that is routed to the switch fabric.

More specifically, with respect to servo module $225_i$, the O/E detectors 730 and 731 are coupled to tap couplers $630_1$ and $630_3$ of FIGS. 8–9. More specifically, the O/E detectors 730 and 731 are configured to detect incoming, optical tap signals 640 and 662, convert the optical tap signals 640 and 662 into corresponding electrical control signals measuring a power level of the outgoing light signal, and optionally route the electrical control signals to corresponding amplifiers 735 and 736. The (amplified) electrical control signals are provided to the A/D converter 720. The A/D converter 720 converts the electrical control signals into measured power sense signals 644 of a digital form. The measured power sense signals 644 are provided to the first processing unit 710.

Herein, the first processing unit 710 may perform a number of operations based on the electrical control signals such as threshold crossing, LOS integration, input/output power ratio analysis and the like. Software and other information necessary for performing these operations may be obtained from the memory 715 by the first processing unit 710. Herein, memory 715 can be non-volatile memory such as non-volatile random access memory, electrically erasable programmable read only memory (EEPROM) and the like.

The optical detector module 700 includes multiple status identification components 717 (e.g., light emitting diodes "LEDs"). A first LED 718 identifies whether any operational faults associated with the servo module $225_i$ have occurred. A second LED 719 indicates when the optical detector module 700 is in service.

Referring still to FIG. 11, in this embodiment, the servo mirror control module 750 comprises the second processing unit 755 that is coupled to both the first processing unit 710 and the third processing unit 775. For instance, in order to adjust the switch fabric in response to the measured power sense signals 644, the second processing unit 755 receives information representative of the measured power sense signals from the first processing unit 710 via connectors 705 and 790. The second processing unit 755 further receives information representative of measured power sense signals for the light signal at a targeted I/O port. This information is provided by the SCM 236 over link 580 via the third processing unit 775. This assists in reducing errors in adjusting the torsional flexures of the mirrors.

Upon receipt of these measured power readings, the second processing unit 755 controls a particular SDG circuit corresponding to a mirror associated with the I/O port over which the tapped light signal was routed. The control involves slight mirror orientation adjustments if the power level readings differ substantially.

In particular, a first hinge position sensor 780 senses a position of a mirror via link 510 from the first optical switch core 240. The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 785 and applied to a selected mirror of the first optical switch core in order to adjust the amount of torsional flexure along a first dimensional plane (e.g., X-axis). This is accomplished to minimize the loss experienced by the light signal.

A second hinge position sensor 781 senses a position of a mirror for the first optical switch core along a second dimensional plane (e.g., Y-axis). The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 786 and are applied to the selected mirror of the first optical switch core in order to adjust the amount of torsional flexure along the second dimensional plane. The specifics of the hinge position sensors 780 and 781 are described in a PCT application entitled "Micromachined Members Coupled for Relative Rotation By Torsional Flexure Hinges" (International Publication No. WO 00/13210) published on or around Mar. 9, 2000.

In another embodiment, when I/O port module $215_s$ is the destination of a light signal, the second processing unit 755 receives information representative of the measured power sense signals associated with the optical tap signal 662 that has been analyzed by the first processing unit 710. The optical tap signal 662 is based on an output light signal being routed from an I/O port. In this situation, the third processing unit 775 receives information associated with the measured power sense signals from a source I/O port as reported by SCM 236 over link 580.

IV. Redundant Architecture of the Optical Cross-Connect Switching System

Figure 12:
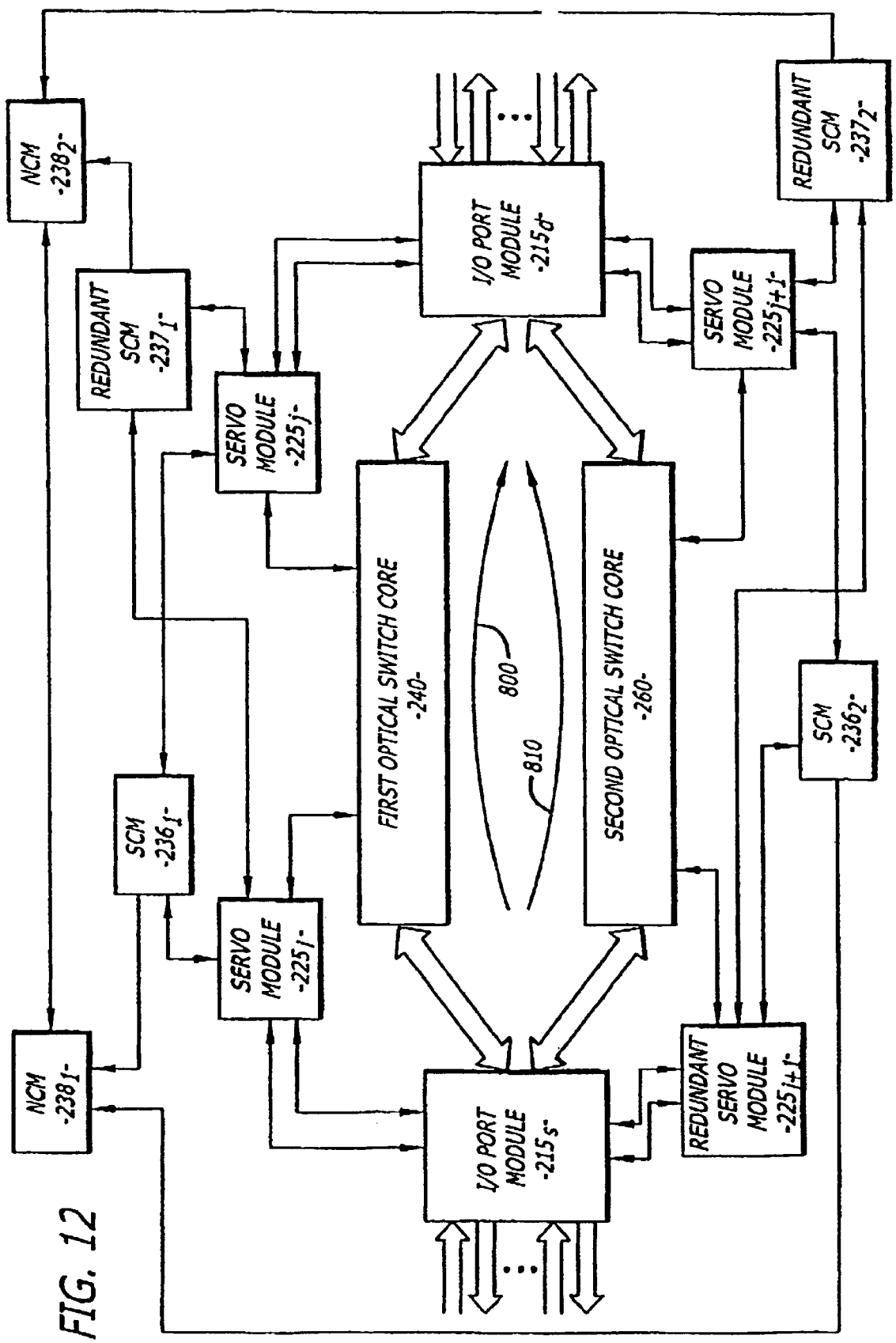
FIG. 12 is an exemplary block diagram of a redundant architecture of the optical cross-connect switching system of FIG. 1.

Referring now to FIG. 12, a block diagram of an alternative embodiment of the architecture of the optical cross-connect switching system of FIG. 1 is shown which includes redundant protection capabilities. Redundancy is desired in order to increase the reliability of such an optical cross-connect switching system. Aside from the I/O port modules, all other modules are duplicated to obtain the desired redundancy. Thus, it is necessary for light signals from a source I/O port module $215_s$ to be routed to a destination I/O port module $215_d$ through two optical paths, namely a primary optical path 800 using a first optical switch core 240 and a redundant optical path 810 using a second optical switch core 260.

With respect to the primary optical path 800, a servo module $225_i$ is connected to both the source I/O port module $215_s$ and the first optical switch matrix (not shown) of the first optical switch core 240. In particular, the servo module $225_i$ controls the physical orientation of a mirror of the first optical switch matrix that corresponds to the source I/O port module $215_s$. To establish and maintain the primary optical path 800 for the light signal, the servo module $225_i$ needs to communicate with other servo modules such as servo module $225_j$. Thus, a servo control module (SCM) is implemented to support such communications, possibly through a time-slot switching arrangement.

As shown, the SCMs $236_1$–$236_2$ are also duplicated so that each servo module 225 is connected to at least two SCMs $236_1$–$236_2$. Thus, in the event that the SCM $236_1$ fails, the primary optical path 800 remains intact because communications between the servo modules $225_i$ and $225_j$ are maintained via redundant SCM $237_1$. The transfer is accomplished by temporarily halting the adjustment of (i.e. freezing) the mirrors inside the first optical switch core 240 while control is transferred from SCM $236_1$ to SCM $237_1$. The SCMs $236_1$ and $237_1$ associated with the first optical switch core 240 are in communication via a network control modules (NCMs) $238_1$ and $238_2$ for example.

With respect to the redundant optical path 810, a servo module $225_{i+1}$ is connected to both the source I/O port module 215 and one or more mirror(s) of a first optical switch matrix (not shown) of the second optical switch core 260. Another servo module $225_{j+1}$ is connected to both the destination I/O port module $215_d$ and one or more mirror(s) of a second optical switch matrix (not shown) of the second optical switch core 260. The orientation of these mirrors produces the redundant optical path 810.

To establish and maintain the redundant optical path 810 for the light signal, a SCM $236_2$ may be implemented with a dedicated time-slot switching arrangement in order to support continuous communications between the servo module and another redundant servo module associated with the destination I/O port module. As shown, the SCM $236_2$ is also duplicated so that each servo module $225_{i+1}$ and $225_{j+1}$ is connected to at least two SCMs $236_2$ and $237_2$. Thus, the redundant optical path 810 is maintained even when one of the SCMs $236_2$ and $237_2$ fails. The SCMs $236_2$ and $237_2$ associated with the second optical switch core 260 communicate via the first NCM $238_1$ and the second NCM $238_2$, respectively. The second NCM $238_2$ is in communication with the first NCM $238_1$ to allow all SCMs and servo modules to communicate for coordination of the primary optical path 800 and the redundant optical path 810.

V. Signaling Interface

Figure 13:
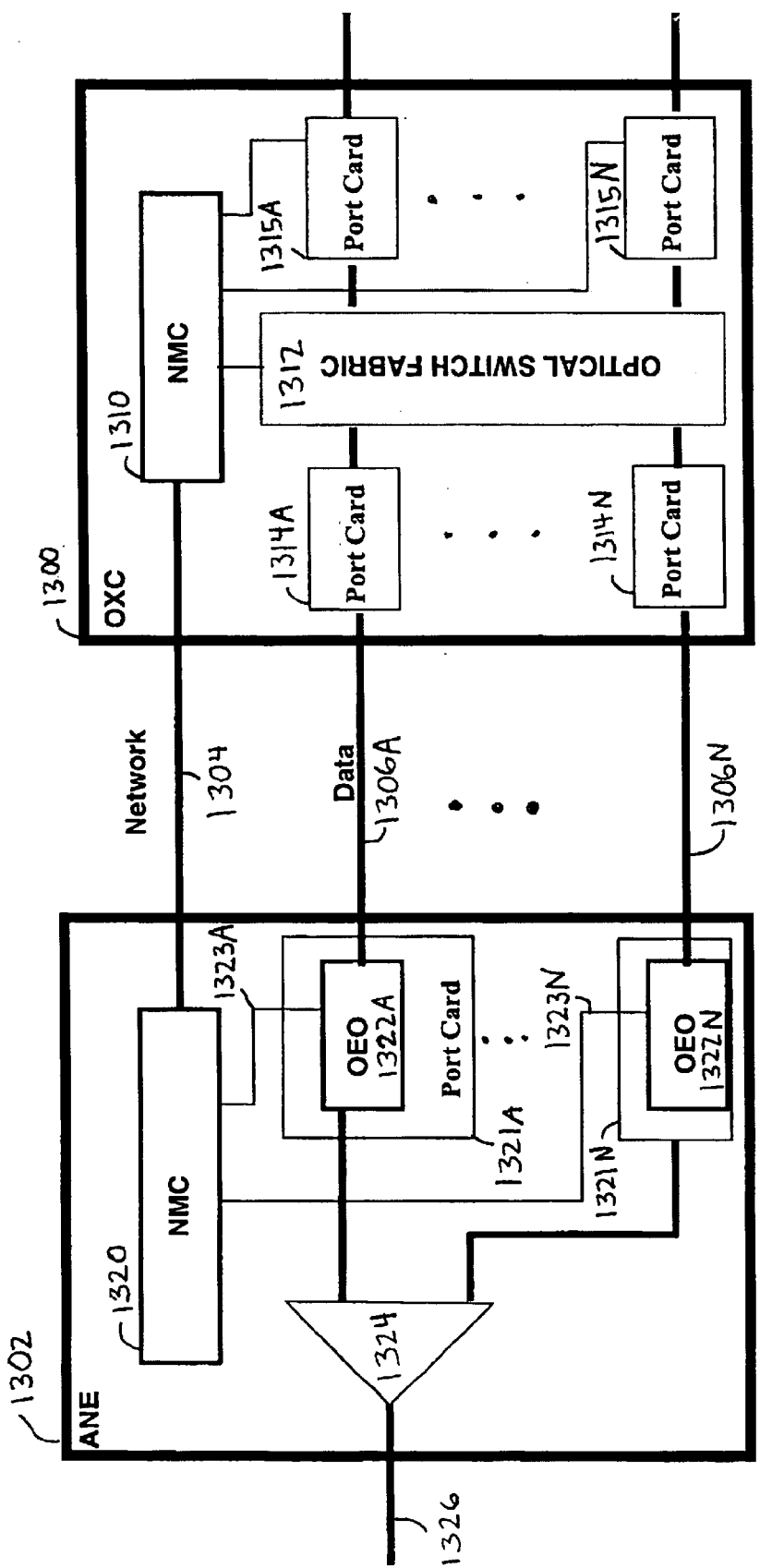
FIG. 13 is a block diagram illustrating an out-of-band signaling interface between an optical cross-connect switch and attached network equipment.

The present invention includes alternate embodiments for realizing a signaling interface between optical cross-connect switches and attached network equipment (ANE). Referring to FIG. 13, optical cross-connect switches (OXCs) 1300 are deployed in a telecommunications network. An optical cross-connect switch can also be referred to herein as optical cross-connect switching system, OXC, or optical cross-connect. Attached to the optical cross-connect switches in a telecommunications network is one or more pieces of attached network equipment (ANE) 1302. The attached network equipment (ANE) 1302 includes telecommunication network devices such as a wavelength division multiplexed (WDM) line terminals, SONET add/drop multiplexers, internet protocol (IP) routers, additional optical cross-connect switches and Asynchronous Transfer Mode (ATM) switches which are also collectively referred to as client equipment. WDM line terminals provide interconnection between sites and are also terminating devices included in SONET add/drop multiplexers, internet protocol (IP) routers, or Asynchronous Transfer Mode (ATM) switches. The present invention establishes a signaling interface between the optical cross-connects 1300 and attached network equipment (ANE) 1302.

There are a number of reasons for establishing a signaling interface between the optical cross-connects 1300 and attached network equipment (ANE). One reason is to allow the other network equipment in the telecommunications network to provision connections through the OXC. It is very desirable to allow other equipment to set up a connection through the OXC in an automated manner, rather than manually provisioning such connections. Another reason is to provide real-time performance monitoring and other management information to the optical cross-connects 1300 from the attached network equipment 1302. By providing a signaling interface where performance information is provided back to the optical cross-connects 1300, expensive monitoring elements are not needed inside the optical cross-connects 1300 and costs are saved. The attached network equipment usually already have electronic components for monitoring signals, such as optical-to-electrical-to-optical converters (OEOs or O/E/Os), in order to extract such information from optical signals. Thus, the electronics for monitoring do not need to be duplicated inside the optical cross-connects 1300 when they are already provided in the attached network equipment 1302. Instead the optical cross-connects 1300 can obtain the real-time performance monitoring and other management information from the other network equipment that is attached to the optical cross-connects 1300 through a signaling channel. Another reason to establish a signaling interface is so that the attached network equipment 1302 can obtain monitoring and other management information real-time from the optical cross-connects 1300. The optical cross-connects 1300 can similarly monitor received optical signals on its input ports and provide information back to the attached network equipment 1302. Preferably, the optical cross-connects 1300 only monitor the optical power of the received optical signals by tapping off a small percentage of the energy of the optical signal and use optical-to-electrical converters (OEs or O/Es) to determine the optical power without using O/E/Os.

FIG. 13 illustrates a block diagram of an out-of-band signaling interface between an optical cross-connect switch 1300 and attached network equipment 1302. The signaling interface is realized by using an out-of-band communication channel over a network 1304 which may also be referred to as an out-of-band signaling channel. In-band communication channels are those used by the optical cross-connect switch 1300 to switch data signals on the one or more data signals lines 1306A–1306N. An out-of-band communication channel is a communication channel other than that used by the optical cross-connect switch 1300 to switch its data signals on the data lines 1306A–1306N. The in-band communication channels used to switch data signals on the data lines 1306A–1306N by the optical cross-connect switch 1300 are light signals, also referred to as photonic signals or optical signals, that are carried in optical fibers. The data lines 1306A–1306N are not used for the signaling interface because these lines carry high-bandwidth signals. To convert optical signals in the optical domain into electrical signals in the electrical domain to extract signaling information is a very expensive process. Indeed, a major reason for using an all-optical cross-connect is to avoid converting signals from the optical domain to the electrical domain. The out-of-band signaling channel is provided on a network 1304 such as a LAN, a MAN, the internet or other WAN. Each of the data lines 1360A–1306N is bi-directional to provide duplex data communication channels. The data lines 1306A–1306N in one embodiment include at least two optical fibers for data flow in each direction between the optical cross-connect switch and the attached network equipment 1402 to provide full duplex data communication channels. In another embodiment, each of the data lines 1306A–1306N is a single optical fiber to provide bi-directional signal flow in both directions and can be full or half duplex data communication over a single optical fiber. Full duplex is accomplished over a single optical fiber by transmitting and detecting signals in the single optical fiber at each end. The network 1304 also provides a bi-directional out-of-band signaling channel so that signals can be received and transmitted in each direction between the optical cross-connect switch and the attached network equipment 1402 and other network equipment coupled to the network 1304. The out-of-band signaling channel can be either full duplex or half duplex in providing bi-directional data communication.

Data signals from the optical cross-connect switch 1300 on the data lines 1306A–1306N are coupled into the attached network equipment 1302. The data lines 1306A–1306N are a light transmission media, such as optical fibers, coupled between the optical cross-connect switch 1300 and the attached network equipment 1302 to carry or transport the light pulses or photon pulses of the data signals there-between. That is, the attached network equipment 1302 is coupled or attached to the optical cross-connect switch 1300 to accept data signals transported over the one or more data lines 1306A–1306N. Data signals from the attached network equipment (ANE) 1302 on the data lines 1306A–1306N are coupled into the optical cross-connect switch 1300. The optical cross-connect switch 1300 is coupled or attached to the attached network equipment 1302 to accept data signals transported over the one or more data lines 1306A–1306N.

The optical cross-connect switch 1300 includes the network management controller (NMC) 1310 (also previously referred to herein as a network control module (NCM)), one or more I/O port cards 1314A–1314N and 1315A–1315N, and the optical switch fabric 1312. The optical switch fabric generates optical paths therein in order to cross-connect (also referred to as route or switch) optical signals from an I/O port card on the input side to an I/O port card on the output side. The optical paths are bi-directional in that the optical signal can flow in either direction with the optical path coupled to either an input port or an output port of a port card. I/O port cards can also be referred to as line cards, port cards, or I/O port modules as previously used herein. Each of the one or more I/O port cards 1314A–1314N and 131SA–1315N of the optical cross-connect switch 1300 includes an optical input port and an optical output port to couple to the optical fibers of the full duplex data lines 1306A–1306N. Port cards 1314 can also include some simple monitoring functions by tapping off a small percentage of the energy of the optical signal and converting it into an electrical signal using an inexpensive O/E. However, port cards 1314 do not need a full-fledged receiver for extensive monitoring of parameters such as a bit error rate or the presence of a particular frame because the signaling interface of the present invention is provided in order to acquire such information from other network equipment.

The attached network equipment 1302 includes a network management controller 1320 and one or more I/O port cards 1321A–1321N (also referred to as line cards or herein previously as I/O port modules). Each of the one or more I/O port cards 1321A–1321N includes an optical-electrical-optical converter 1322A–1322N on its data input ports to couple to optical fibers of the data lines 1306A–1306N. The one or more optical-electrical-optical converters 1322A–1322N first convert the optical signals on the data lines 1306A–1306N into electrical signals and then convert the electrical signals into optical signals.

The one or more optical-electrical-optical converters 1322A–1322N can be used for a number of reasons including to generate electrical signals to monitor the optical signal as well as to amplify (i.e. regenerate) low level incoming optical signals. In the conversion process, the one or more optical-electrical-optical converters 1322A–1322N provide information regarding the optical signals in electrical form which is tapped for monitoring purposes as the electrical signals 1323A–1323N. The electrical signals 1323A–1323N may include information from other sources of the respective port card 1315A–1315N that may be of relevance to the optical cross-connect switch. The one or more optical-electrical-optical converters 1322A–1322N and their electrical signals were originally used in the attached network equipment 1302 to facilitate its functionality and monitor its performance and not provide feedback to an optical cross-connect switch.

The electrical signals 1323A–1323N are coupled into the network management controller (NMC) 1320 of the attached network equipment 1302. In one embodiment, the electrical signals 1323A–1323N, or a representation thereof, are signaled back to the optical cross-connect switch 1300 over the out-of-band signaling channel on the network 1304. The electrical signals 1323A–1323N, or a representation thereof, are transmitted from the network management controller 1320 in the attached network equipment 1302 to the network management controller 1310 in the optical cross-connect switch 1300. In this manner, the attached network equipment 1302 signals to the optical cross-connect switch 1300. In a similar manner with differing information, the optical cross-connect switch 1300 can signal to the attached network equipment 1302 over the out-of-band signaling channel.

The optical-electrical-optical converters 1322A–1322N are expensive and as a result of being already available in the attached network equipment 1302, they are not needed in the optical cross-connect switch 1300 if the signaling interface of the present invention is provided. This can provide considerable cost savings when purchasing optical cross-connect switches 1300.

In FIG. 13, the attached network equipment 1302 that is coupled to the optical cross-connect switch 1300 is a WDM line terminal 1302 which also includes a wave division multiplexer/demultiplexer 1324 along with the network management controller 1320 and the one or more port cards 1321A–1321N with the optical-electrical-optical converters 1322A–1322N. The wave division multiplexer/demultiplexer 1324 couples to a pair of optical fibers on one end to carry wave divisioned multiplexed signals 1326 in each direction for full duplex communication and one or more pairs of optical fibers on an opposite end to couple to the I/O port cards 1321A–1321N. The wave division multiplexer/demultiplexer 1324 multiplexes multiple light signals received from respective optical fibers in one direction into a wave division multiplexed signal 1326 having multiple light signals of different wavelengths carried over one optical fiber. The wave division multiplexer/demultiplexer 1324 demultiplexes a wave division multiplexed signal 1326 in an opposite direction having multiple light signals of different wavelengths carried over one optical fiber into multiple light signals for transmission to the optical cross-connect switch 1300 over the data lines 1306A–1306N. The wave division multiplexed signal 1326 provides greater data bandwidth and channel capacity over an optical fiber.

The network connection to the network 1304 for the out-of-band signaling channel is an Ethernet, an RS232 or other similar connection connecting together the network management controllers (NMCs) (also previously referred to as a network control module (NCM)) of the optical cross-connect switch 1300 and the attached network equipment 1302. Because the out-of-band signaling channel is provided over the network 1304, other network equipment or monitoring stations can receive information and transmit information or control signals over the out-of band signaling channel regarding the network, the network equipment and the optical network components connected to the network. Thus, management of the network can be facilitated regarding the optical cross-connect 1300, the attached network equipment 1302, and other network equipment using the out-of-band signaling channel. The out-of-band signaling channel over the network can be considered a centralized signaling interface.

Figure 14:
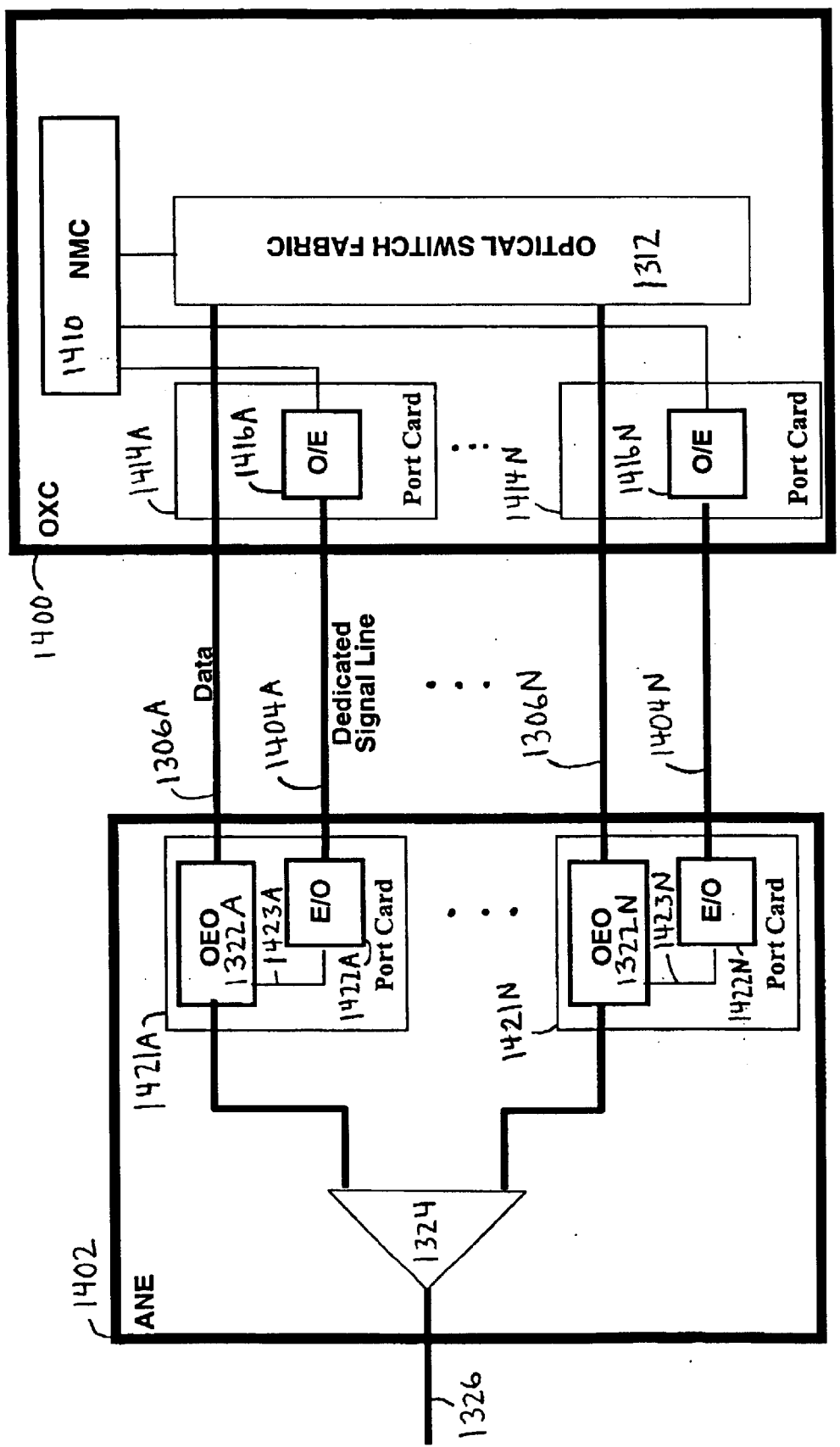
FIG. 14 is a block diagram illustrating a decentralized signaling interface between an optical cross-connect switch and attached network equipment.

Referring now to FIG. 14 a block diagram of a decentralized signaling interface between an optical cross-connect switch 1400 and attached network equipment 1402 is illustrated. The decentralized signaling interface is provided by one or more dedicated signal lines 1404A–1404N between the optical cross-connect switch 1400 and the attached network equipment 1402. The one or more dedicated signal lines 1404A–1404N can be formed by using low-cost multimode (MM) optical fibers or by using low cost electrical wire links.

The one or more dedicated signal lines 1404A–1404N replaces the out-of-band signaling channel of the network 1304. Whereas the out-of-band signaling channel of the network 1304 provided signals regarding switching each of the optical signals on multiple communication channels, one dedicated signal line 1404 provides information regarding switching of optical signals on one communication channel. Furthermore, the centralized signaling between the between the optical cross-connect switch 1400 and the attached network equipment 1402 was performed by the centralized NMCs 1310 and 1320 at a central control level. In contrast, decentralized signaling is performed by the I/O port cards (also referred to as line cards or herein previously as I/O port modules) at a line-card level which is a much lower level than the centralized NMC level.

In the embodiment illustrated in FIG. 14, the optical cross-connect switch 1400 includes the network management controller (NMC) 1310, one or more I/O port cards 1414A–1414N (also referred to as line cards, port cards and I/O port modules), and the optical switch fabric 1312. Each of the one or more I/O port cards 1414A–1414N and 1415A–1415N of the optical cross-connect switch 1400 includes an optical input port and an optical output port. Each of the one or more port cards 1414A–1414N further may include optical-electrical converters (O/E) 1416A–1416N if the dedicated signal line is an optical fiber. The optical-electrical converters 1416A–1416N of the optical cross-connect switch are much less expensive than optical-electrical-optical converters (O/E/O) that might otherwise be needed therein. Optical-electrical converters (O/E) are typically a fiber optic receiver module which includes a photodetector.

The attached network equipment 1402 includes one or more port cards 1421A–1421N (also referred to as line cards). Each of the one or more port cards 1321A–1321N includes an optical-electrical-optical converter 1322A–1322N on its data input ports to couple to optical fibers of the data lines 1306A–1306N. In the case the dedicated signal lines 1404A–1404N are optical fibers, each of the one or more port cards 1321A–1321N further includes an electrical-optical converter (E/O) 1422A–1422N to convert electrical signals 1423A–1423N into optical signals. Electrical-optical converters (E/O) are typically a fiber optic transmitter module which include a semiconductor laser with control electronics. Optical-electrical-optical converters (O/E/O) are typically a combination of an O/E converter coupled together with an E/O converter.

The attached network equipment 1402 that is illustrated coupled to the optical cross-connect switch 1400 is a WDM line terminal 1402. A WDM line terminal 1402 also includes a wave division multiplexer 1324 along with the one or more port cards 1421A–1421N with the optical-electrical-optical converters 1322A–1322N.

The one or more optical-electrical-optical converters 1322A–1322N first convert the optical signals on the data lines 1306A–1306N into electrical signals and then convert the electrical signals into optical signals. The one or more optical-electrical-optical converters 1322A–1322N are tapped to provide information regarding the optical signals in electrical form on the electrical signals 1323A–1323N. The port cards 1421A–1421N of the attached network equipment 1402 detect other relevant information and communicate it directly to the respective port cards 1414A–1414N of the optical cross-connect switch 1400 over the dedicated signal lines 1404A–1404N rather than signaling between the central NMCs 1310 and 1320. Similarly, port cards 1414A–1414N of the optical cross-connect switch 1400 can detect relevant information and communicate it directly to the respective port cards 1421A–1421N of the attached network equipment 1402 over the dedicated signal lines 1404A–1404N.

Having established a signaling interface, it can be used for several purposes. The signaling interface can be used to enable fast network restoration through the optical cross-connect switch (OXC) in the event of network failures. Network failures include signal failures such as a loss of signal (LOS) or signal degradation such as through a bit error rate (BER) or other commonly know optical failure mechanisms. Attached network equipment (ANE) can detect failures in real time by using its O/E/Os and convey this information to the optical cross-connect switch over the signaling interface so that it can perform network restoration. The optical cross-connect switch is typically without O/E/Os and may not be able to detect the failure due to the otherwise relatively simple monitoring usually found within an optical cross-connect switch.

Another use for the signaling interface is to allow attached network equipment (ANE) to control the optical cross-connect switch (OXC). For example, the attached network equipment (ANE) could signal to the OXC over the signaling interface in order for it to provide a particular switch configuration.

Another use for the signaling interface is so that the optical cross-connect switch can signal to the attached network equipment to set specific parameters therein. For example during setting up a connection, the optical cross-connect switch may ask the attached equipment to adjust its transmitter power level.

Another use for the signaling interface is to allow attached network equipment (ANE) to request a connection through the optical cross-connect switch (OXC). The optical cross-connect switch (OXC) sets up the connection and informs the attached network equipment (ANE) when its available.

Another use for the signaling interface is to perform protection switching between the OXC and the attached network equipment. For example, the signaling interface could be provided by one spare fiber facility for N working facilities between the attached equipment and the OXC. If one of these N facilities fails, the signaling channel is used by both devices to switch connections from the failed facility to the spare facility.

The present invention is thus described and has many advantages over the prior art. One advantage of the present invention is that the costs of optical cross-connect switches can be reduced by utilizing the signaling interfaces of the present invention. Another advantage of the present invention is that real time performance information can be obtained. Still another advantage of the present invention is that control and monitoring of the performance of an optical cross-connect switch can be performed over the network of the out-of-band signaling interface.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the present invention or some of its features in hardware, firmware, software or a combination thereof where the software is provided in a processor readable storage medium such as a magnetic, optical, or semiconductor storage medium.

What is claimed is:

1. A signaling interface comprising:
   an optical cross-connect switch to couple to network equipment over a network, the optical cross-connect switch to receive network management signals from the network equipment and to transmit network management signals to the network equipment, the optical cross-connect switch including
      an optical switch fabric of optical switches to switch optical data signals from one optical network connection to another optical network connection; and,
   a signaling channel on the network to transceive network management signals, the signaling channel independent of the optical network connections to transceive optical data signals, the signaling channel to carry the network management signals between the optical cross-connect switch and the network equipment.

2. The signaling interface of claim 1 wherein, the network management signals received from the network equipment by the optical cross-connect switch include information regarding performance of the optical cross-connect switch.

3. The signaling interface of claim 1 wherein, the network management signals received from the network equipment by the optical cross-connect switch include information to control the optical cross-connect switch.

4. The signaling interface of claim 1 wherein, the network management signals transmitted to the network equipment by the optical cross-connect switch include information regarding performance of the optical cross-connect switch.

5. The signaling interface of claim 1 wherein, the network management signals transmitted to the network equipment by the optical cross-connect switch include information regarding the optical data signals input into the optical cross-connect switch.

6. The signaling interface of claim 1 wherein, the signaling channel is an out-of-band signaling channel.

7. The signaling interface of claim 1 wherein, the optical cross-connect switch further includes
   one or more port cards, each of the one or more port cards coupled to the optical switch fabric to accept optical data signals and having an optical output port to couple to the network equipment and transport optical data signals thereto.

8. The signaling interface of claim 7 wherein, the network equipment has one or more optical-electrical-optical converters each providing an electrical signal responsive to optical data signals received from the optical cross-connect switch.

9. The signaling interface of claim 8 wherein, the network management signals transmitted from the network equipment over the signaling channel to the optical cross-connect switch are responsive to the optical data signals received from the optical cross-connect switch.

10. The signaling interface of claim 1 wherein,
the optical cross-connect switch further includes
a network management controller to couple to the network to transmit and to receive network management signals over the signaling channel regarding the optical cross-connect switch and the network equipment.

11. The signaling interface of claim 1 wherein,
the optical switch fabric includes a pair of optical switch matrices each having a plurality of micro-machined mirrors to direct optical data signals from the one optical network connection to the another optical network connection.

12. The signaling interface of claim 11 wherein,
the optical cross-connect switch further includes
a bounce mirror between the pair of optical switch matrices.

13. The signaling interface of claim 1 wherein,
the network is one or more of a local area network, a metropolitan network, a wide area network, an internet, or an intranet.

14. The signaling interface of claim 1 wherein,
the optical cross-connect switch couples to the network using an Ethernet connection or an RS232 connection.

15. A method for signaling an optical cross-connect switch, the method comprising:
providing a network management signaling channel on a network independent of the optical network connections carrying data;
switching input optical signals into attached network equipment; and
receiving a network management signal over the network management signaling channel from attached network equipment in response to the switching of the input optical signals.

16. The method of claim 15 further comprising:
transmitting a network management signal over the network management signaling channel to attached network equipment in response to the switching of the input optical signals.

17. The method of claim 15 wherein,
the network management signaling channel is an out-of-band signaling channel.

18. The method of claim 14 wherein,
the switching of the input optical signals into attached network equipment is provide by micro-machined mirrors.

19. A signaling interface comprising:
one or more port cards in an optical cross-connect switch, each of the one or more port cards to accept optical data signals and having an optical output port to couple to network equipment and transport the optical data signals thereto, and
each of the one or more port cards further having a dedicated switch management signal line, in addition to the optical output port, to couple to a respective port card of the network equipment, the dedicated switch management signal line to transmit and receive switch management signals regarding the optical cross-connect switch and the network equipment.

20. The signaling interface of claim 19 wherein,
the switch management signals received from network equipment over the dedicated signal line include information regarding performance of the optical cross-connect switch.

21. The signaling interface of claim 19 wherein,
the switch management signals received from network equipment over the dedicated signal line include information to control the optical cross-connect switch.

22. The signaling interface of claim 19 wherein,
the network equipment has one or more optical-electrical-optical converters each providing an electrical signal responsive to optical data signals received from the one or more port cards.

23. The signaling interface of claim 22 wherein,
the switch management signals received from the network equipment over the dedicated switch management signal line are responsive to electrical signals converted from optical data signals received from the one or more port cards by the one or more optical-electrical-optical converters.

24. The signaling interface of claim 19 wherein,
the optical cross-connect switch includes a pair of optical switch matrices each having a plurality of micro-machined mirrors to direct optical data signals from one network connection to another.

25. The signaling interface of claim 24 wherein,
the optical cross-connect switch further includes
a bounce mirror between the pair of optical switch matrices.

26. The signaling interface of claim 19 wherein,
the dedicated switch management signal line is an optical connection.

27. The signaling interface of claim 26 wherein,
each of the one or more port cards further includes an optical-electrical converter to couple to the dedicated switch management signal line, the optical-electrical converter to convert optical switch management signals on the dedicated switch management signal line into electrical switch management signals.

28. The signaling interface of claim 19 wherein,
the dedicated switch management signal line is an electrical connection.

29. The signaling interface of claim 19 wherein,
the signals transmitted to network equipment over the dedicated switch management signal line from the one or more port cards includes information regarding performance of the optical cross-connect switch.

30. The signaling interface of claim 19 wherein,
the switch management signals transmitted to network equipment over the dedicated switch management signal line from the one or more port cards includes information regarding the optical data signals input into the optical cross-connect switch.

31. A method for signaling an optical cross-connect switch, the method comprising:
providing a dedicated switch management signal line, independent of optical data ports for optical data signals, between I/O ports of the optical cross-connect switch and I/O ports of attached network equipment;
switching optical data signals into the attached network equipment; and
receiving a first control signal over the dedicated switch management signal line from the attached network equipment in response to the switching of the optical data signals.

32. The method of claim 31 further comprising:
transmitting a second control signal over the dedicated switch management signal line to an I/O port of the attached network equipment in response to the switching of the optical data signals.

33. The method of claim 31 wherein,
the receiving of the first control signal over the dedicated switch management signal line is received by an I/O port of the optical cross-connect switch.

34. The method of claim 31 wherein,
the switching of input optical data signals into attached network equipment is provided by micro-machined mirrors.

35. A method of network restoration in an optical telecommunications network, the method comprising:
coupling network equipment to an optical cross-connect switch;
detecting a network failure in the optical telecommunications network by the network equipment;
signaling the network failure to the optical cross-connect switch using a network management signaling interface, the network management signaling interface independent of I/O ports, the I/O ports for optical data signals; and
responsive to the signaling, the optical cross-connect switch adjusting to the network failure in order to restore the optical telecommunications network.

36. The method of claim 35 wherein,
the network equipment includes optical-electrical-optical converters to detect the network failure and the optical cross-connect is without optical-electrical-optical converters to detect the network failure.

37. The method of claim 35 wherein,
the network failure is a signal failure.

38. The method of claim 35 wherein,
the network failure is a signal degradation.

39. The method of claim 35 wherein,
the adjusting to the network failure includes switching from a failed data line to an unused operational data line.

40. A method of forming a connection in a telecommunications network, the method comprising:
signaling a request for the connection to an optical cross-connect switch using a network management signaling interface, the network management signaling interface independent of I/O ports, the I/O ports for optical data signals;
setting up the connection through the optical cross-connect switch; and
signaling the availability of the connection through the optical cross-connect switch using the network management signaling interface.

41. The method of claim 40 wherein,
the connection through the optical cross-connect switch is an optical path to transport the optical data signals.

42. The method of claim 40 wherein,
the network management signaling interface is an out-of-band signaling interface.

43. The method of claim 42 wherein,
the out-of-band signaling interface is a network connection.

44. The method of claim 40 wherein,
the network management signaling interface is an in-band signaling interface.

45. The method of claim 44 wherein,
the in-band signaling interface is a direct signal connection between the optical cross-connect switch and the network equipment requesting the connection.

46. A method of adjusting parameters in network equipment of a telecommunications network, the method comprising:
signaling a request to adjust parameters in an optical network equipment using a network management signaling interface, the network management signaling interface independent of I/O ports, the I/O ports for optical data signals;
adjusting the optical network equipment in response to the request to adjust parameters in the optical network equipment; and
signaling the completion of the adjustment to the optical network equipment using the network management signaling interface.

47. The method of claim 46 wherein,
the connection through the optical network equipment is an optical cross-connect switch.

48. The method of claim 46 wherein,
the network management signaling interface is an out-of-band signaling interface.

49. The method of claim 48 wherein,
the out-of-band signaling interface is a network connection.

50. The method of claim 46 wherein,
the network management signaling interface is an in-band signaling interface.

51. The method of claim 50 wherein,
the in-band signaling interface is a direct signal connection between the optical cross-connect switch and the network equipment requesting the connection.

52. A signaling interface comprising:
an optical cross-connect switch to couple to network equipment over a network, the optical cross-connect switch to receive network management signals from the network equipment and to transmit network management signals to the network equipment, the optical cross-connect switch including
an optical switch fabric of optical switches to switch optical data signals from one optical network connection to another optical network connection; and,
an out-of-band signaling channel on the network independent of the optical switch fabric, the out-of-band signaling channel to carry the network management signals between the optical cross-connect switch and the network equipment.

53. The signaling interface of claim 52 wherein,
the network management signals received from the network equipment by the optical cross-connect switch include information regarding performance of the optical cross-connect switch.

54. The signaling interface of claim 52 wherein,
the network management signals received from the network equipment by the optical cross-connect switch include information to control the optical cross-connect switch.

55. The signaling interface of claim 52 wherein,
the network management signals transmitted to the network equipment by the optical cross-connect switch include information regarding performance of the optical cross-connect switch or information regarding the optical signals input into the optical cross-connect switch.

56. The signaling interface of claim 52 wherein,
the optical cross-connect switch further includes
one or more port cards, each of the one or more port cards coupled to the optical switch fabric to accept optical data signals and having an optical output port to couple to the network equipment and transport optical signals thereto.

57. The signaling interface of claim 56 wherein, the network equipment has one or more optical-electrical-optical converters each providing an electrical signal responsive to optical data signals received from the optical cross-connect switch.

58. The signaling interface of claim 57 wherein, the network management signals transmitted from the network equipment over the out-of-band signaling channel to the optical cross-connect switch are responsive to the optical data signals received from the optical cross-connect switch.

59. The signaling interface of claim 52 wherein, the optical cross-connect switch further includes
a network management controller to couple to the network to transmit and to receive the network management signals over the out-of-band signaling channel regarding the optical cross-connect switch and the network equipment.

60. The signaling interface of claim 52 wherein, the optical switch fabric includes a pair of optical switch matrices each having a plurality of micro-machined mirrors to direct optical data signals from the one optical network connection to the another optical network connection.

61. The signaling interface of claim 60 wherein, the optical cross-connect switch further includes
a bounce mirror between the pair of optical switch matrices.

62. The signaling interface of claim 52 wherein, the network is one or more of a local area network, a metropolitan network, a wide area network, an internet, or an intranet.

63. The signaling interface of claim 52 wherein, the optical cross-connect switch couples to the network equipment to provide the out-of-band signaling channel using an Ethernet connection or an RS232 connection.

* * * * *